United States Patent [19]
Beauvais et al.

[11] Patent Number: 5,022,707
[45] Date of Patent: Jun. 11, 1991

[54] VEHICLE SAFETY DEVICE

[75] Inventors: Randall Beauvais, Fenton; Albert J. Meade, Ballwin, both of Mo.

[73] Assignee: Life Force Associates, L.P., Fenton, Mo.

[21] Appl. No.: 261,300

[22] Filed: Oct. 25, 1988

Related U.S. Application Data

[63] Continuation-in-part of Ser. No. 240,200, Sep. 7, 1988, which is a continuation-in-part of Ser. No. 195,946, May 19, 1988, which is a continuation-in-part of Ser. No. 167,005, Mar. 11, 1988, which is a continuation-in-part of Ser. No. 142,674, Jan. 7, 1988, abandoned.

[51] Int. Cl.$^5$ .............................................. B60R 21/00
[52] U.S. Cl. ................................... 297/216; 243/371; 243/424; 296/68.1; 297/311; 297/325
[58] Field of Search ............... 297/216, 325, 311, 329, 297/344; 248/371, 424, 429; 296/68.1

[56] References Cited

U.S. PATENT DOCUMENTS

| | | |
|---|---|---|
| 45,050 | 11/1864 | Kimball . |
| 2,227,717 | 1/1941 | Jones . |
| 2,660,222 | 11/1953 | Woodsworth . |
| 2,725,921 | 12/1955 | Markin . |
| 2,735,476 | 2/1956 | Fieber . |
| 2,789,650 | 7/1953 | Krous . |
| 2,818,909 | 7/1957 | Burnett . |
| 2,823,730 | 2/1958 | Lawrence . |
| 2,826,241 | 3/1958 | Himka . |
| 2,883,206 | 4/1959 | Racine . |
| 2,970,862 | 2/1961 | Racine . |
| 2,978,273 | 4/1961 | Racine . |
| 3,112,955 | 12/1963 | Stolz . |
| 3,460,791 | 8/1969 | Judd . |
| 3,463,543 | 8/1969 | Zellar . |
| 3,552,795 | 1/1971 | Perkins et al. . |
| 3,582,133 | 6/1971 | DeLavenne ............... 297/216 X |
| 3,610,679 | 10/1971 | Amato ..................... 297/216 X |
| 3,697,128 | 10/1972 | Strien et al. . |
| 3,731,972 | 5/1973 | McConnell . |
| 3,853,298 | 12/1974 | Libkle et al. ............... 248/429 |
| 3,858,930 | 1/1975 | Calandra . |
| 3,897,036 | 7/1975 | Nystrom ................... 248/399 |
| 4,042,276 | 8/1977 | Breitschwerdt . |
| 4,634,169 | 1/1987 | Hasstedt . |

FOREIGN PATENT DOCUMENTS

| | | |
|---|---|---|
| 234522 | 7/1964 | Austria . |
| 537159 | 4/1955 | Belgium . |
| 1430028 | 3/1969 | Fed. Rep. of Germany . |
| 3237167 | 4/1984 | Fed. Rep. of Germany ...... 297/216 |
| 823912 | 7/1937 | France . |
| 1253143 | 12/1960 | France . |
| 509033 | 10/1937 | United Kingdom . |
| 1242386 | 8/1971 | United Kingdom . |

Primary Examiner—Peter R. Brown
Attorney, Agent, or Firm—Kenyon & Kenyon

[57] ABSTRACT

A vehicle safety device designed to respond to a sudden stopping of a vehicle by controlling movement of both the front and the rear of a vehicle seat in forward and upward directions. In various embodiments the movement is controlled by ramps and linkages and by various combinations of ramps and links. The linkage may be a single component link or a linkage of two components pivotally connected together. The ramp may be defined by a straight slot or by an arcuate slot or a combination thereof.

72 Claims, 11 Drawing Sheets

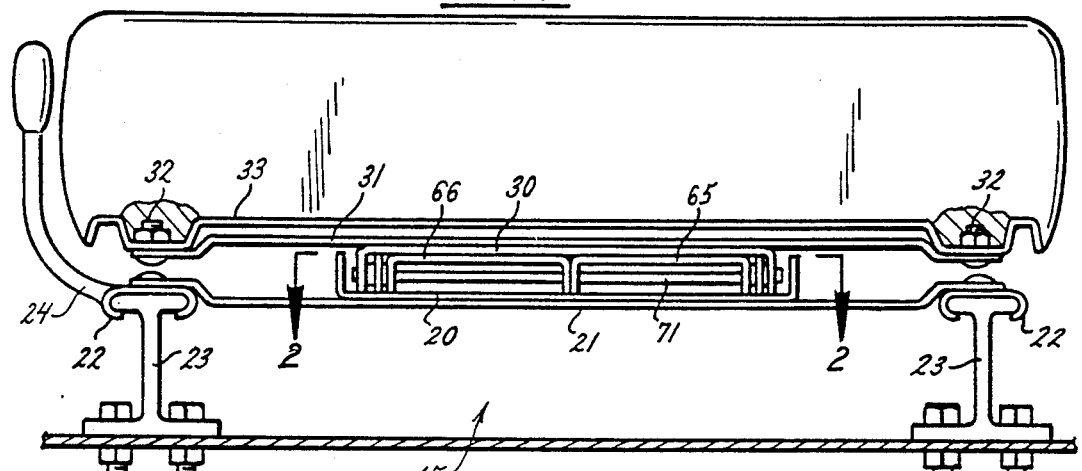
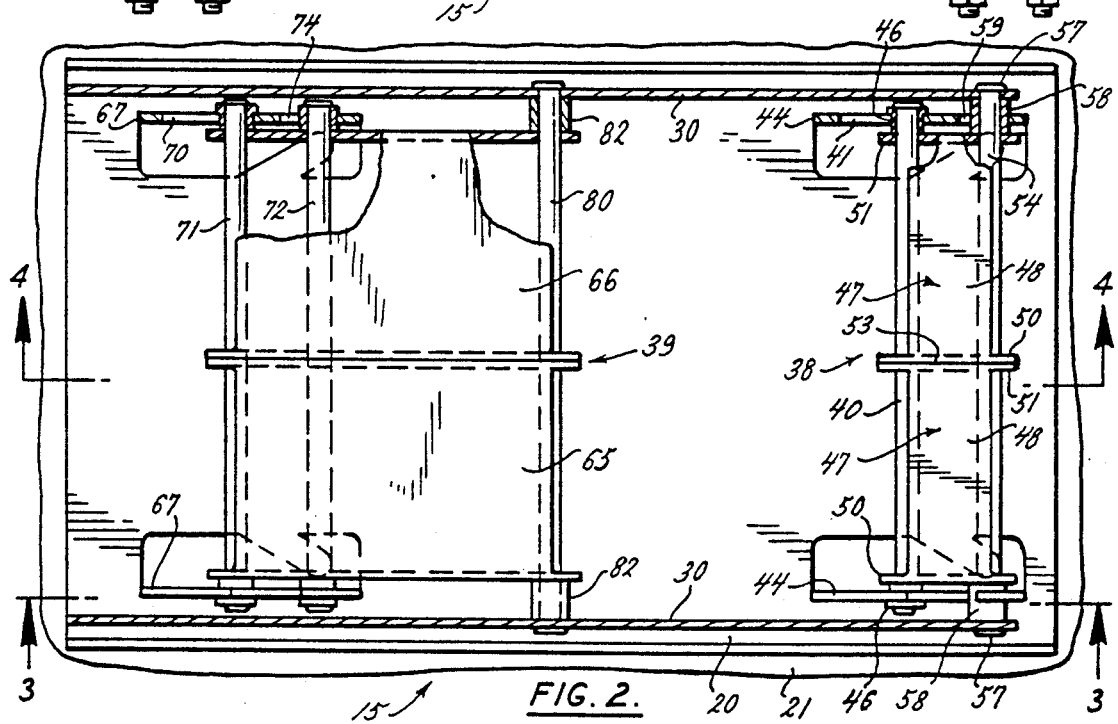
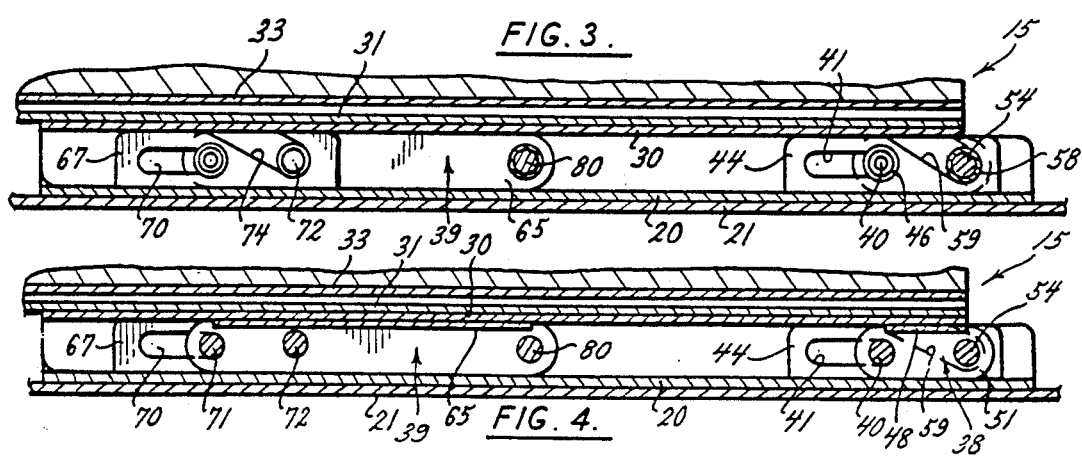

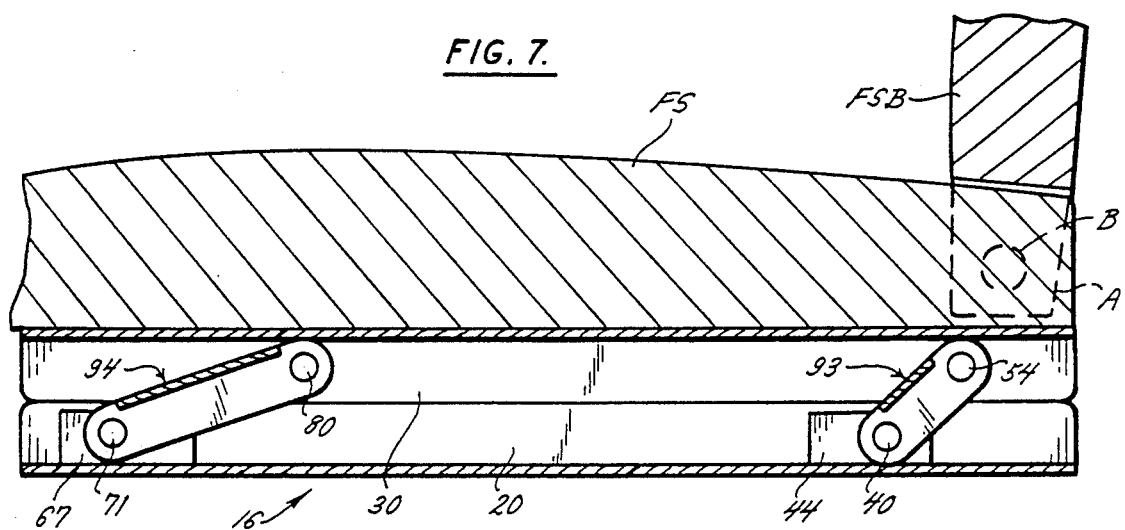
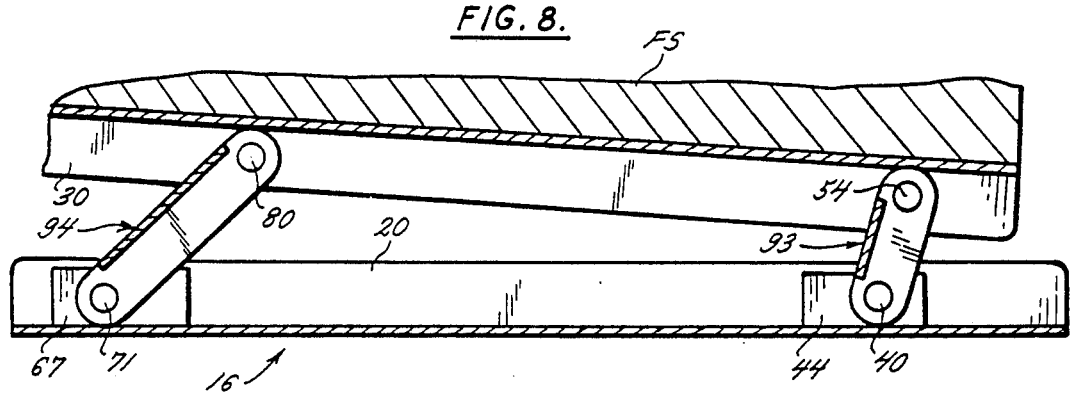
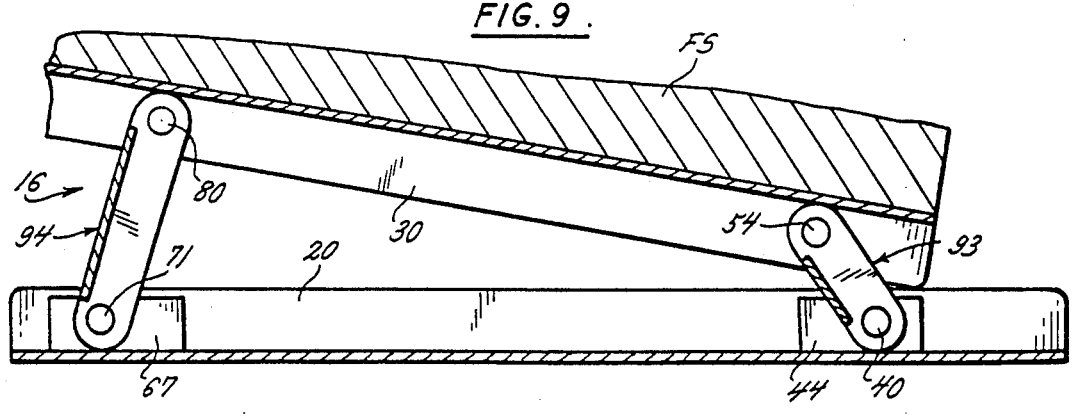

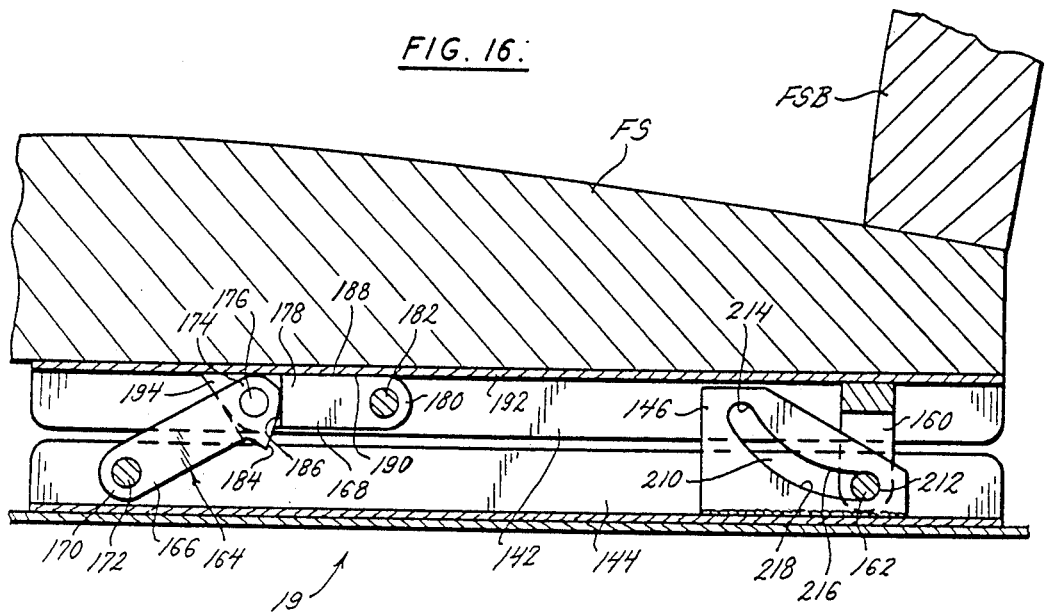
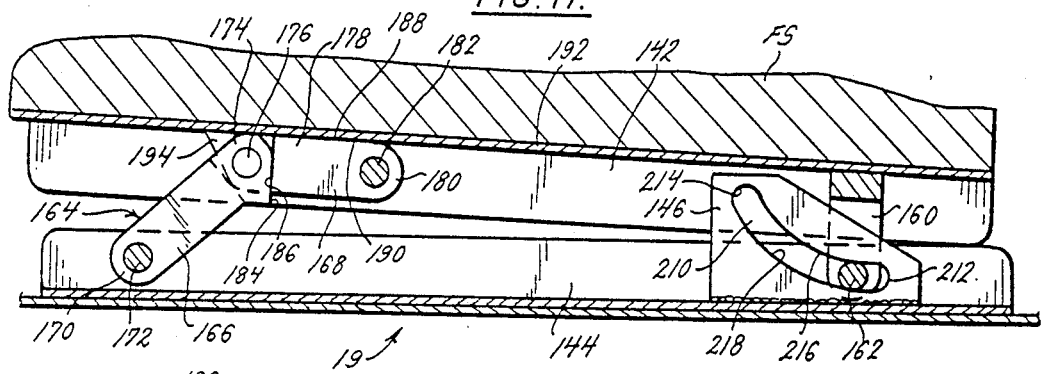
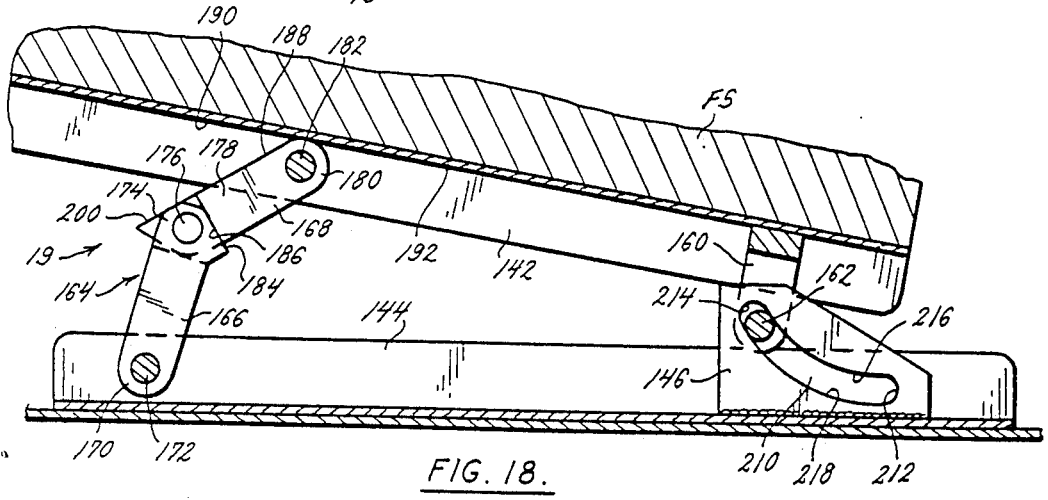

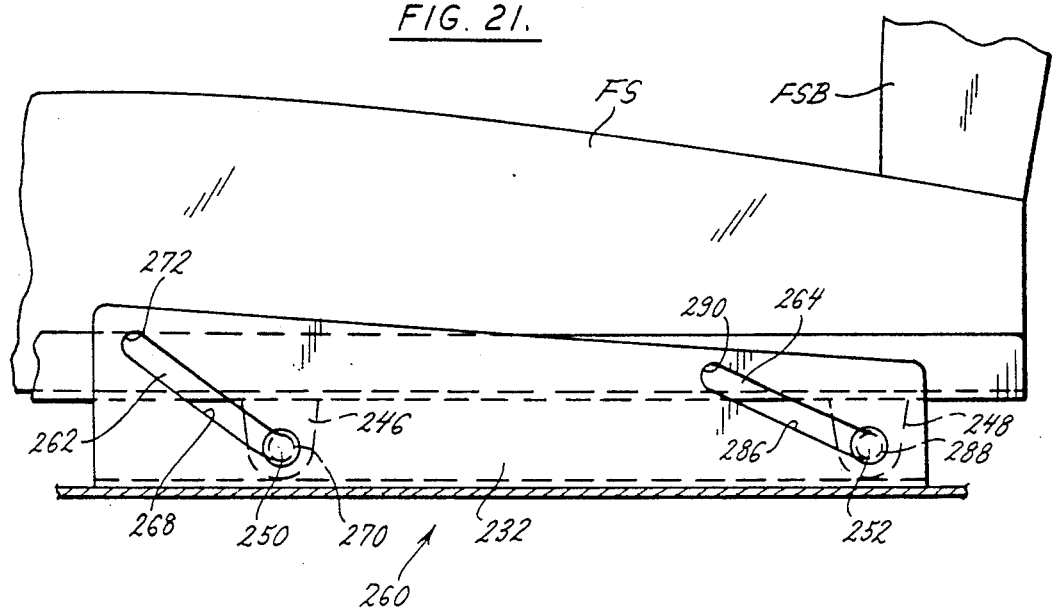
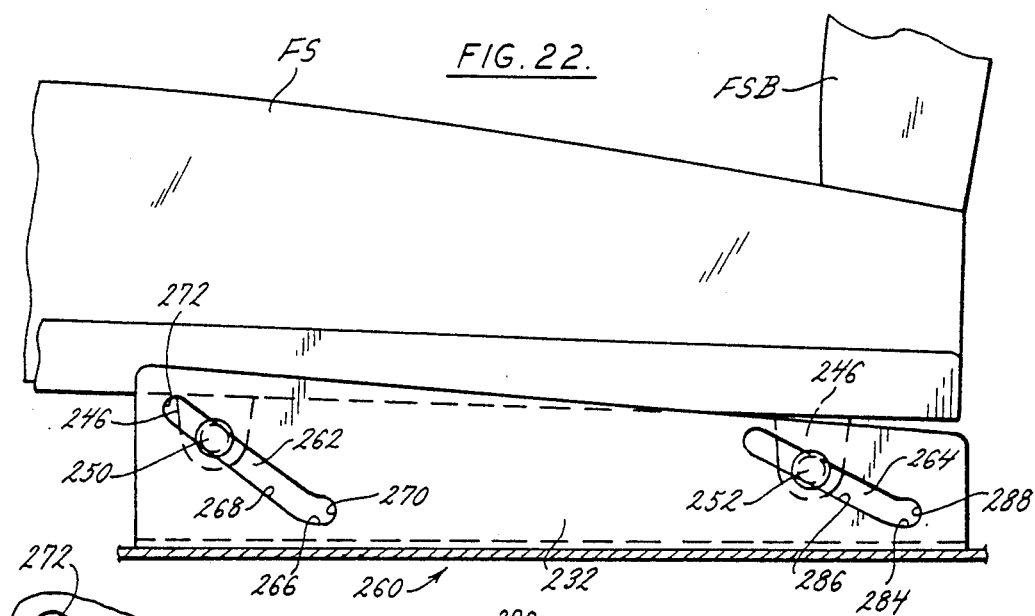
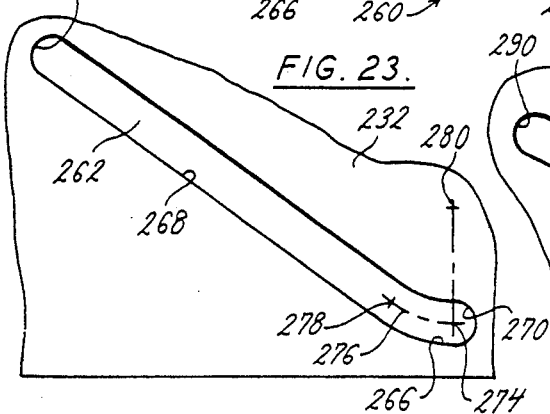
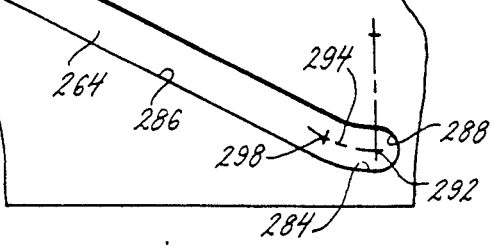

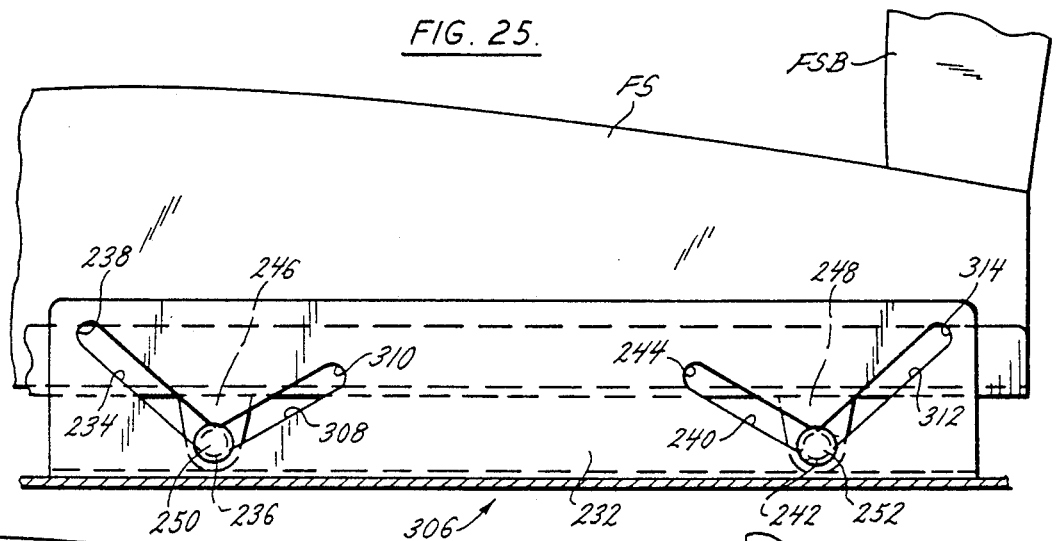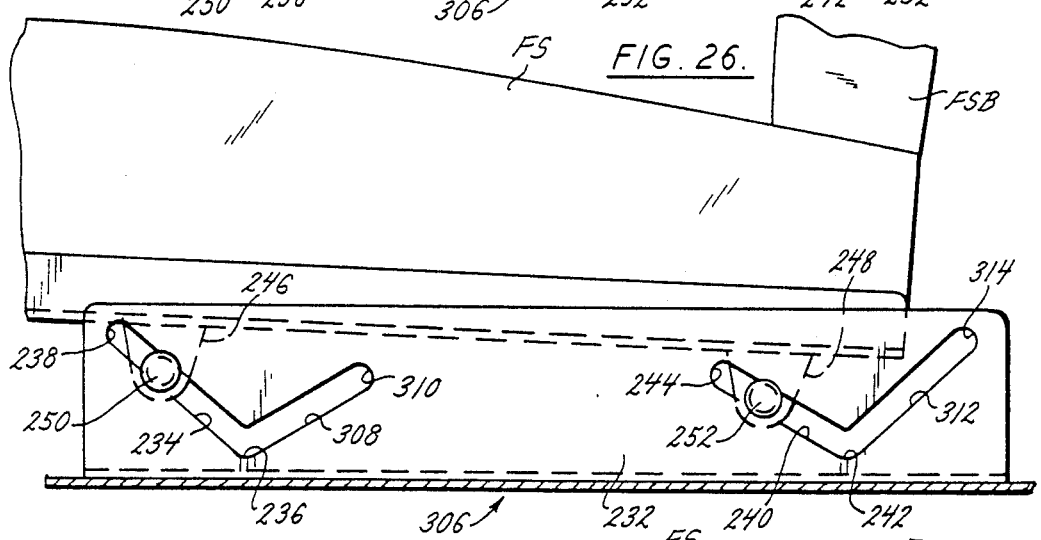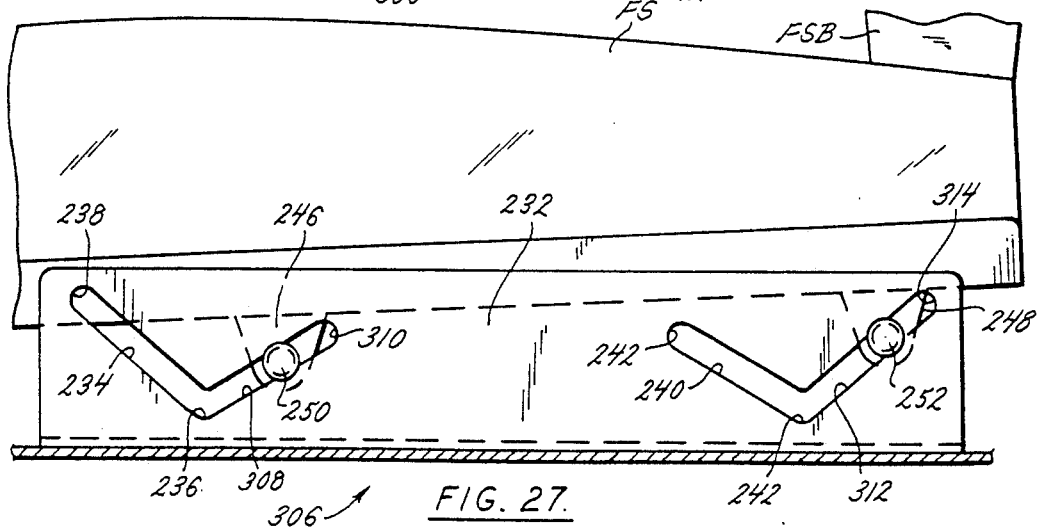

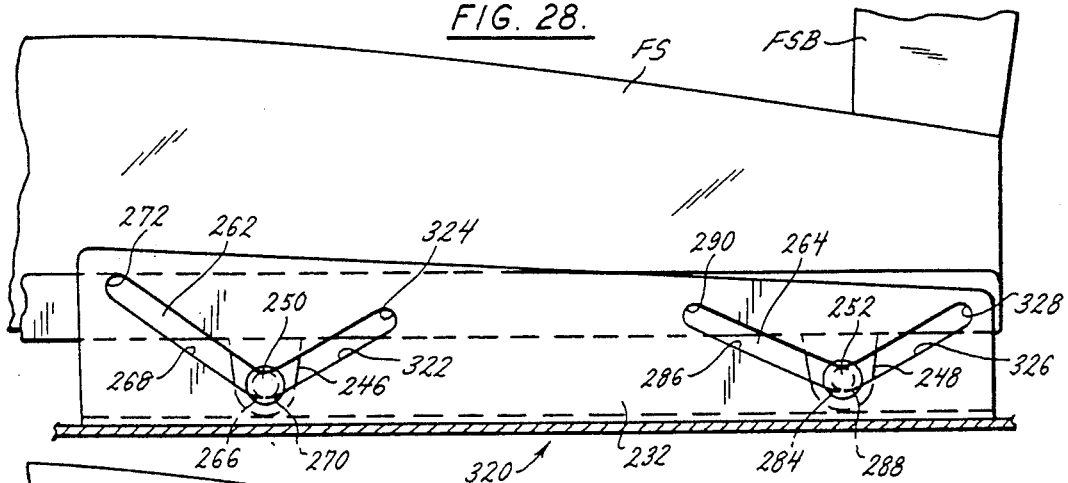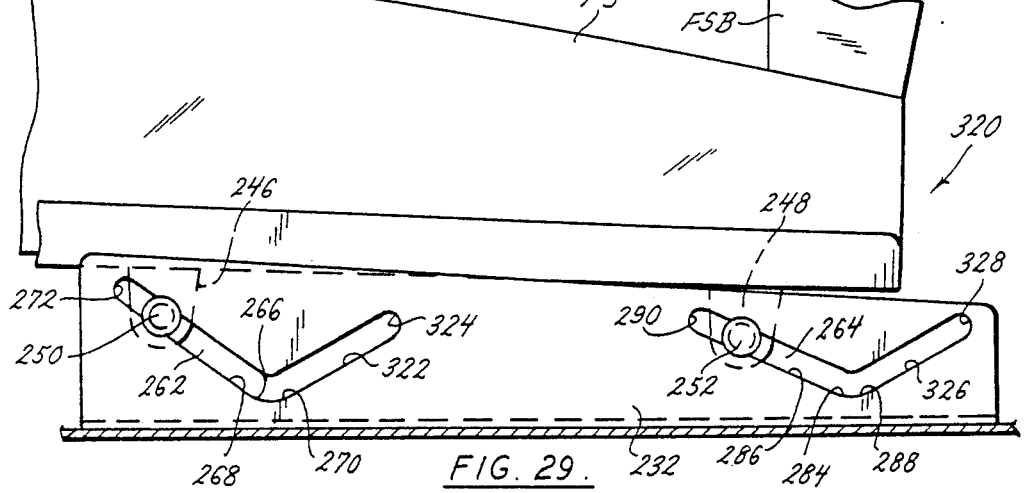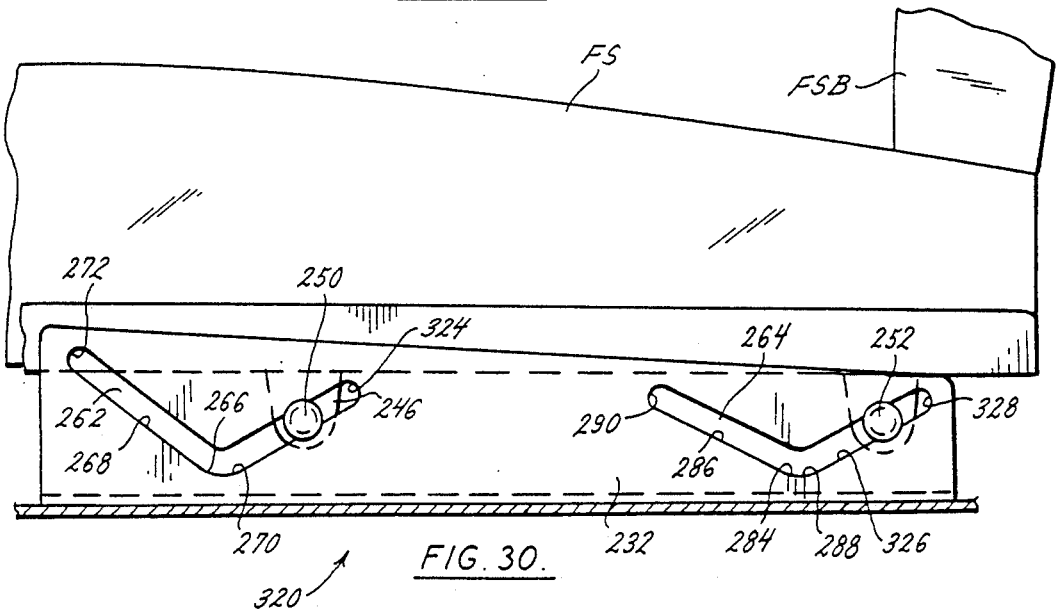

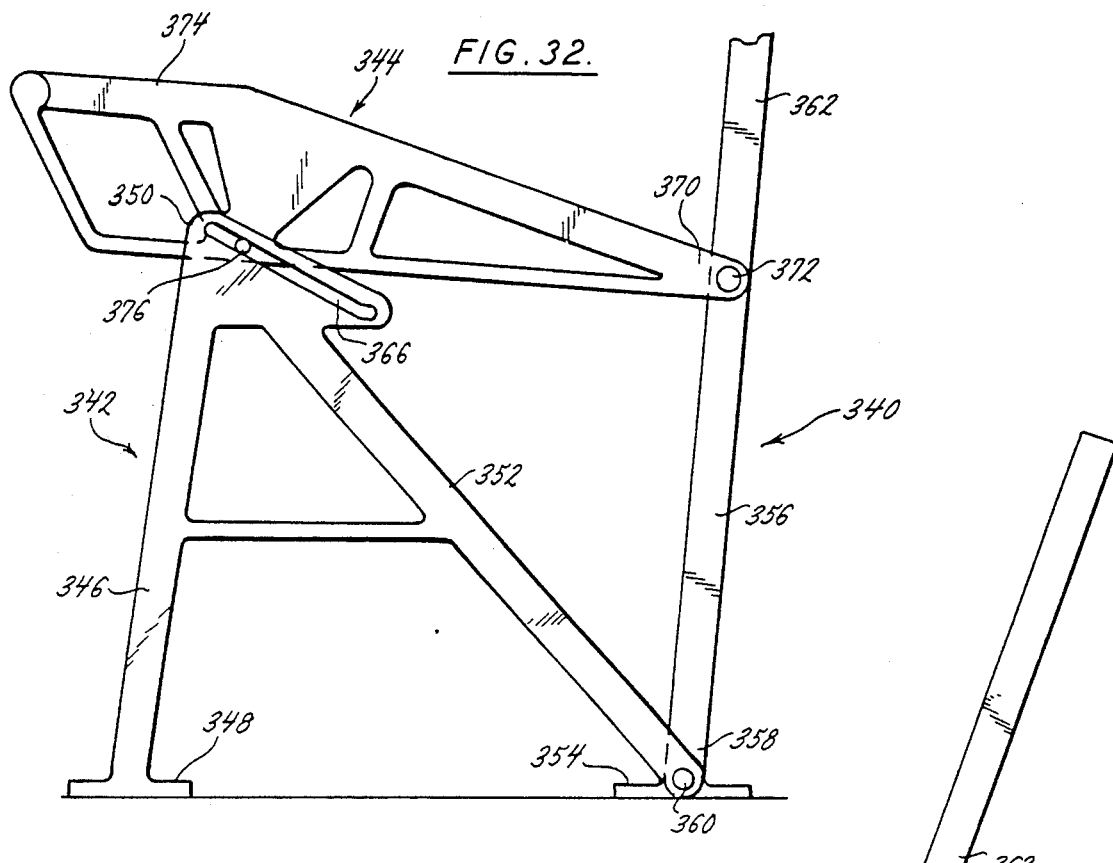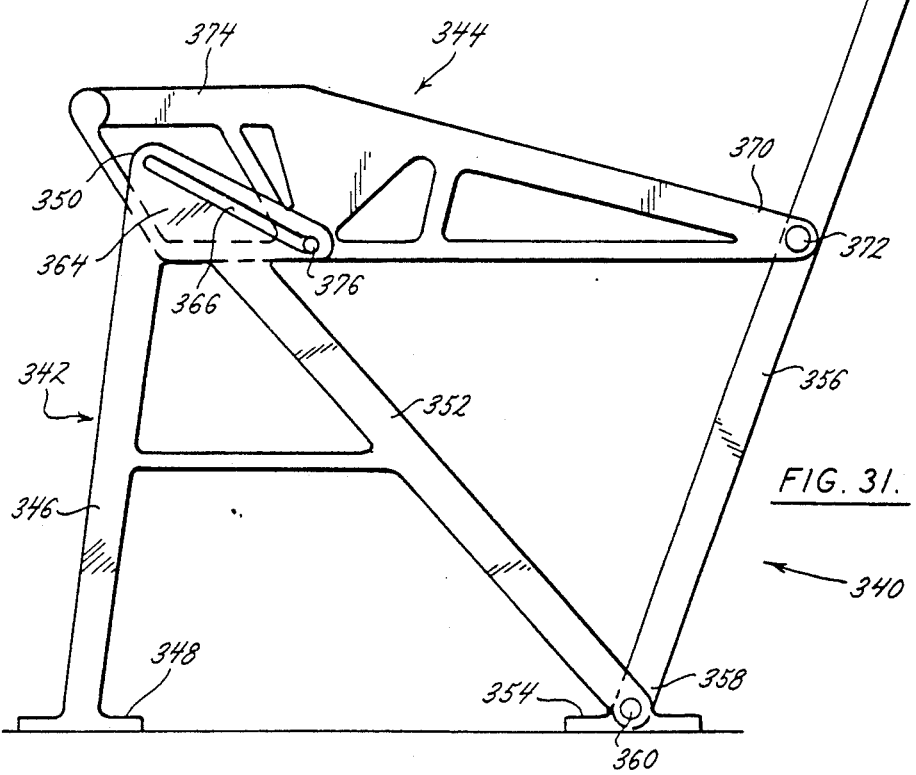

VEHICLE SAFETY DEVICE

This application is a continuation-in-part of U.S. application Ser. No. 240,200 filed Sept. 7, 1988, which is a continuation-in-part of U.S. application Ser. No. 195,946 filed May 19, 1988, which is a continuation-in-part of U.S. application Ser. No. 167,005 filed March 11, 1988, which is a continuation-in-part of U.S. application Ser. No. 142,674 filed Jan. 7, 1988.

BACKGROUND AND SUMMARY OF THE INVENTION

This invention relates to vehicle safety devices. It is primarily concerned with safety of persons in automobiles and other vehicles resulting from a collision.

Various vehicle safety devices have been proposed including those dependent on inertia and those with power drive or power assist. Inertia type devices are responsive to inertial forces. Motions that can be produced by external power are generally believed unachievable by inertia responsive devices. The inertia type can be typified by U.S. Pat. Nos. 2,818,900 to Burnett, 3,452,543 to Zellar, and 2,823,730 to Lawrence. Power-operated devices use externally generated power to force a particular motion or motions. Power operated safety devices are typified by U.S. Pat. Nos. to Calandra 3,858,930, Racine 2,970,862, and Krous 3,789,650.

It is an object of the present invention to provide movement of a vehicle seat in such fashion as to increase or take advantage of the factors that are involved in retaining a human body in the seat of the vehicle involved in a collision. These factors include time or duration of movement of the seat, distance moved, and pressure applied by the seat to the occupant. There is a very short duration, on the order of 0.03 seconds depending upon vehicle speed at impact, between the instant an occupant's forward momentum starts propelling him forward to the instant when the occupant has impacted the windshield and flown through it or has impacted an immovable barrier within the vehicle. A device designed to prevent such injury impacts must function within that very short duration.

Power operated safety devices have serious disadvantages. They require that a sensor respond to an event and initiate an action or that some other mechanism perform a function to cause the device to work. Such requirements require precise timing and can fail to perform within the time duration available or at least can fail to perform soon enough for the device to do its job within that duration. Also, power operated safety devices are very expensive and have a number of components that can deteriorate or fail. To the contrary, upon vehicle impact, the present device responds entirely to the inertia of the vehicle seat, and seat back, if connected to the seat, to initiate its action. In other words, the device functions instantly in response to the shock force of a collision. The present device is inexpensive and has only a few parts.

The instant safety device utilizes a perceived difference between the inertial reaction of the inanimate seat and seat back to a collision and the inertial reaction of a live occupant. In this respect, it appears that the inanimate seat and seat back react and move more quickly than does the live passenger. The safety device produces a motion to the seat that dissipates the forward momentum of the passenger by moving the passenger upward as well as forward to increase both the distance and duration of travel of the occupant. The result is that the passenger remains bonded to the seat longer, beyond the time his momentum would have propelled him from the seat. In addition, spinal compression is minimized by the device of this invention. The device dissipates momentum and stops all parts of the passenger's body, not just some. For example, there is minimum head snap or whiplash with this device.

It has been determined that if the seat is mounted so that the rear of the seat and the front of the seat will move forward and upward, but at different rates, the factors above mentioned will be improved and the person riding on the seat will be retained on the seat without injury from the collision. One of the effects of the upward movement of the seat is that, since the live occupant does not move as quickly as the inanimate seat, the upward movement of the seat applies increased pressure force to the bottom of the occupant and increases the frictional contact between the occupant and the seat. This increased friction further helps in maintaining contact between the occupant and the seat. In other words, the bonding force between the seat and the occupant is increased because the seat, both at its front and rear, moves upwardly faster than does the live passenger.

It has been determined that the action required of the device when connected to a seat, typically the front seat, to which a seat back is integrally connected, is different from the action required when the device is connected to a seat, typically the back seat, to which no seat back is connected. (The seat back is connected directly to the chassis.) For this reason, one embodiment, the first described, although usable on a front seat, is better suited for installation with a seat to which no back is connected, typically a rear seat. The remaining embodiments of the device are better suited for installation on a seat that has a seat back connected to it, typically a front seat. However, these remaining embodiments can be used on a backless seat. The differences between these embodiments will be described.

First, however, common to all embodiments is the fact that in a conventional vehicle, the connections between the seat frame and the floor frame may be by a fixed mounting means such as bolts or welding, or may be by slidable mounting means that enable adjustment of the seat such as to accommodate the driver of the vehicle. In the present invention, the seat frame and floor frame are constructed to accommodate the devices of the embodiments of this invention. In each of the first two embodiments, there are two links connected between the floor frame and the seat frame. The two links are of different lengths, the rear link being short and the front link being long. In the initial rest or unactivated condition, the forward ends of the links are pivotally connected to the floor frame while the rearward ends are pivotally connected to the seat frame. Thus, for the seat frame (and the seat) to move forward, it is forced by the links to move upward also. The rear link being shorter than the front link, any forward movement of the seat will pivot the rear link through a relatively greater arc while the longer forward link swings through a smaller arc, resulting in a greater lift rate of the front of the seat relative to a smaller lift rate of the rear.

It has been found that with a normal pitch of the seat itself from front to rear and with a seat of normal weight, the initial movement which brings the small rear link toward a vertical position, is sufficient to absorb the energy and stop the forward movement of the body of the occupant. However, because of an extremely high speed impact, the rear pivot may swing past 90°, thus raising the forward rocking part of the seat even further, while lowering the rear back to or toward the original elevation thereby applying increased rearward resistance to forward movement of the occupant.

In a third embodiment of the invention, the means for controlling movement of the seat comprises a link with pivotal connections between the floor and seat frames and a pin and slot connection between those frames. The pin and slot are at the rear of the seat and the link is at the front. Preferably, the pin is affixed to the seat frame and the slot is in the floor frame. The slot is located and oriented relative to the seat to cause the pin, and therefore the rear of the seat, to rise at about a 30° angle to a horizontal plane as the seat propels forward. As the front link swings about its pivotal connection to the floor frame, its point of connection to the seat frame traces an arcuate path. However, the length of the link and the locations of its end connections cause the average angle of this arc to approximate about a 45° angle relative to a horizontal plane.

A seat back connected to the back of a seat can affect the operation of the safety device. The seat back acts as a moment arm that adds to the weight of the seat and the occupant in applying a downward force at the front of the seat. To deal with this effect, a fourth embodiment retains the rear connection formed by a pin in approximately a 30° slot, but the forward connection comprises a dual component link. The first link component has a forward end pivotally connected to the floor frame and its rearward end is pivotally connected to the forward end of a second link component. The rearward end of the second link component is pivotally connected to the seat frame. In the at-rest and during initial or first stage movement of the device, the upper surface of the second link bears against a bearing surface on the seat frame, causing the first link component to pivot about its connection to the floor frame and about its connection to the second link component.

There are stop faces on the link components that engage after the first link has pivoted approximately 20°. Thereafter, during a second stage movement, the link components are locked together and upon further pivoting of the first link component about its forward end, the second link component pivots about its rearward end. This dual component link allows the first link to lie at a greater angle (approximately 30°) to horizontal, reducing the initial upward angle of movement of the link, and causes the first stage pivot point to be moved forward (the rear pivot connection of the first link component to the then stationary second link component). Consequently, initial and first stage movement is made easier. The momentum of the first stage movement insures initiation of the second stage.

During the second stage movement, the effective length of the link is increased as the pivot is moved rearward to the point of connection to the seat frame and the effective angle to the link is reduced, thereby increasing the upward angle of movement of the link. The average angle of movement of the pivotal connection at the seat through both stages is approximately 45°.

At least initially, the seat back exerts a downward force on the back of the seat because the seat back starts from a rearward inclination. This downward force is promptly followed by an upward force.

In a fifth embodiment the rear connection incorporates a pin on the seat in an arcuate slot in the floor frame. The arcuate slot allows initial movement of the rear of the seat to be forward with a minimum upward component, followed immediately by a continued increasing of this upward component. This action provided by the arcuate slot makes it easier for the rear of the seat to begin its motion against the downward force produced by the seat back. Yet the average angle of movement of the rear of the seat is about 30° to horizontal. The connection at the front of the seat may be the dual component link of the fourth embodiment.

A sixth embodiment of the invention incorporates a pin and slot arrangement at the front and a pin and slot arrangement at the rear of the safety device that is on each side of the seat. Both slots are straight with the front slot being at a greater angle to horizontal than is the rear slot. As illustrated, this angle is 35° at the front and 25° at the rear. Preferably, the slots are supported by the vehicle floor or base frame and the pins are mounted on the seat or seat frame. The slots act as ramps that direct the front and rear portions of the seat in upward motions at controlled angles as the seat moves forward.

A seventh embodiment is similar to the sixth embodiment except that there is a short arcuate path that introduces the pin to the straight portion of each of the front and rear ramps. These short arcuate paths allow the seat to move initially substantially forward with immediately progressively upward components to the motion and to smoothly enter the straight ramp after the seat has gained some momentum. These short arcuate starting slot portions provide greater assurance that the safety device will initiate its action substantially instantaneously upon deceleration of the vehicle.

An eighth embodiment of the invention is a modification of the sixth embodiment and illustrates how the safety device can be constructed to protect a passenger in the event of sudden deceleration in either a forward or rearward direction such as from a front-end collision or a rear-end collision.

A ninth embodiment is similarly a modification of the seventh embodiment to incorporate slot configurations that allow the device to react in response to forward or rearward decelerations.

A tenth embodiment incorporates the concepts of the invention into a chair seat of the kind used for mass transit, such as a bus seat, train seat or an airplane seat. In this tenth embodiment, the rear of the seat swings with pivoting of the rear leg either about a pivot point at floor level or relatively close to floor level. This causes the rear portion of the seat to move upwardly as it moves forwardly. In the illustration of the tenth embodiment, the front of the seat is controlled by a pin and slot arrangement that incorporates a starting arc but it will be understood that other structures may be incorporated for elevating the front as it moves forward.

It will be recognized that while a number of embodiments are described and illustrated herein incorporating means to control movement of the front of the seat and means to control movement of the rear of the seat, still more embodiments can result from various combinations taken from these embodiments. For example, the means to control the front of the seat taken from one embodiment could be combined with the means for controlling the rear of the seat taken from another embodiment.

In all embodiments, because of the difference between the smaller angle at the rear and the larger angle at the front, the initial and continuing rate of elevation of the seat is greater at the front than at the rear. Also, the average rate of elevation at the front is about equal to the average rate of forward movement whereas at the rear, the average rate of elevation is closer to about half the average rate of forward movement.

As has been said, in all embodiments of the invention, it is important that the seat be propelled upwardly as well as forwardly. This happens for different reasons in the embodiments because of the design and because the front and back seats of a vehicle are typically constructed differently. In the front seat construction, the seat back is connected to the seat. In some cases, the seat back is pivotable about connections at its lower end to the seat but is normally latched in a fixed position. In other constructions, the seat back may be tiltable and lockable in a tilted position. In still other constructions, the seat back may be rigidly connected to the seat In all cases, the connection of the seat back is to the seat rather than to the frame of the vehicle.

In contrast, for the back seat and some front seats, the seat back is not connected to the seat because it is bolted directly to the vehicle chassis or to a component that does not move with the seat in response to a collision. As a result, this seat back essentially stops when the vehicle stops because of its firm mounting to the vehicle chassis, whereas the seat back connected to a front seat, which in an at-rest condition is inclined rearwardly, tends to pivot forwardly about its lowermost connections to the front seat. Because the seat back for the front seat starts from a rearwardly inclined position, the applied movement initially has a downward force component as well as a forward force component applied to the rear portion of the seat. This downward force component is immediately followed by and replaced with an upward force component accompanying the forward force component.

As a result of the foregoing, when the vehicle, as by striking an obstruction, is abruptly stopped or slowed down, inertia will cause both the rider and the seat to tend to move forwardly until the deceleration forces are exhausted. Simultaneously, the seat is caused to rise at both the front and rear, the rear rise being less than the front rise because of the shortness of the rear link or the configuration of the rear slot.

One objective is that the safety device initiate movement of the seat at the instant deceleration of the vehicle begins. Another objective is that the safety device maintain the controlled seat movement for the duration of deceleration of the passenger. In addition, it generally appears that increasing the upward angle of movement of the front and/or the rear of the seat improves the effect of the safety device but also deters initiation of such movement. In view of the foregoing, the angles of rise of the front and rear of the seat can vary from those suggested herein. For example, in the embodiment shown in FIGS. 10 and 11, a front angle of about 45° and a rear angle of about 30° have been suggested and in the embodiment shown in FIGS. 21-24 a front angle of 35° and a rear angle of 25° has been suggested, but variations from these suggested angles are possible.

BRIEF DESCRIPTION OF THE DRAWINGS

FIG. 1 is a front elevation of two embodiments of the invention of this device but illustrating installation on a vehicle front seat;

FIG. 2 is an enlarged horizontal section taken on the line 2—2 of FIG. 1 illustrating a first embodiment of the device for installation on a seat to which a seat back is not directly connected. Typically, for this embodiment, the seat would be affixed to a vehicle floor frame and the adjustment handle and rails that appear in FIG. 1 would not be incorporated;

FIG. 3 is a vertical section taken on the line 3—3 of FIG. 2;

FIG. 4 is a vertical section taken on the line 4—4 of FIG. 2;

FIG. 7 is a vertical section, such as on the line 3—3 of FIG. 2, of a second embodiment of the invention for installation on a seat to which a seat back is directly connected and showing the device in its at-rest condition;

FIG. 8 is a vertical section similar to that of FIG. 7 but showing the device in a partially activated condition impact;

FIG. 9 is a vertical section similar to that of FIGS. 7 and 8 but showing the device in further advanced condition following an extremely severe impact;

FIG. 16 is a side elevation view of a fifth embodiment of the invention shown in an unactivated condition;

FIG. 17 is a side elevation view of the fifth embodiment but showing the device in a partially activated condition;

FIG. 18 is a side elevation view of the fifth embodiment showing the device in a further activated condition;

FIG. 21 is a side elevation view of a seventh embodiment of the invention shown in an unactivated condition;

FIG. 22 is a side elevation view of the seventh embodiment showing the device in an activated condition;

FIG. 23 is an enlarged side elevation view of a forward portion o device of FIGS. 21 and 22;

FIG. 24 is an enlarged side elevation view of a rearward portion of the device of FIGS. 21 and 22;

FIG. 25 is a side elevation view of an eighth embodiment of the invention showing the device in an unactivated condition;

FIG. 26 is a side elevation view of the eighth embodiment showing the device in an activated condition responsive to a front-end collision;

FIG. 27 is a side elevation view of the eighth embodiment showing the device in an activated condition in response to a rear-end collision;

FIG. 28 is a side elevation view of a ninth embodiment of the invention shown in an unactivated condition;

FIG. 29 is a side elevation view of the ninth embodiment of the invention shown in an activated condition in response to a front-end collision;

FIG. 30 is a side elevation view of the ninth embodiment in an activated condition in response to a rear-end collision;

FIG. 31 is a side elevation view of a tenth embodiment of the invention shown in an unactivated condition;

FIG. 32 a side elevation view of the tenth embodiment showing the device in an activated condition.

DESCRIPTION OF PREFERRED EMBODIMENT

Figure 5:
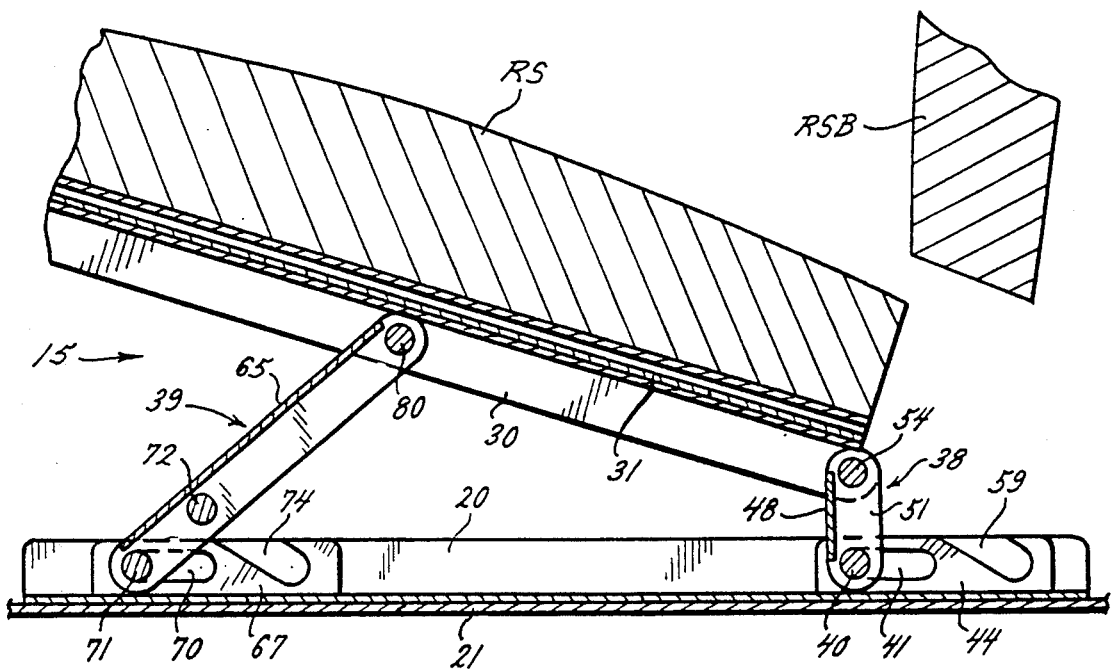
FIG. 5 is a vertical section taken approximately on the line 3—3 of FIG. 2 but showing this device in one of its operative positions.

The present invention is illustrated in its wider form. This wide form is designed to enable a single one of the safety device units to suffice for a single bucket seat rather than to have two spaced narrow safety device units. For a bench seat, two of the devices in wider form can be used at opposite sides of the seat. It is contemplated, however, that the safety device may be made narrower if necessary and various structures may be adapted to achieve the motions contemplated by this invention.

The safety device is illustrated and described in several embodiments. In front elevation, both embodiments 15 and 16 may look the same, such as is illustrated in FIG. 1. However, the embodiment 15 is adapted to be installed on a vehicle rear seat and the remaining embodiments are adapted for installation on a vehicle front seat. It should be understood that the first embodiment 15 can be used on a front seat, and the remaining embodiments can be used on a rear seat, but effectiveness may be reduced.

Both the first two embodiments 15 and 16 of the safety device have upper and lower elements that can be of various forms. For example, the lower element may comprise a base channel 20 having upstanding flanges designed primarily to give it strength and rigidity. All the parts are preferably made of steel, although other metals or materials may be used if otherwise satisfactory. The width of the base channel 20 may be, for example, about eight inches. It is welded or bolted to the base plate or floor frame 21 that is mounted upon the runners 22 that typically are on a vehicle. In turn, the runners 22 slide upon the rails 23, also typically mounted to the floor of a vehicle, when the handle 24 is operated to release the seat holding devices for selective front-to-rear positioning. Thus the present invention will not interfere with the usual seat adjustment as can be made with the handle 24. Nor will the device interfere with power operable seat adjustment mechanisms.

The upper element of the device may comprise a seat holding channel 30 that is inverted with respect to the base channel 20. This seat holding channel 30 is in turn secured to a plate or seat frame 31 that is bolted as at 32 to the bottom 33 of the seat. As illustrated, the two plates or frames 21 and 31 are offset to provide a space between them in which the device of the present invention is mounted. This saves space and reduces the amount of elevation of the seat caused by the presence of this invention.

Of course, some seats, typically rear seats, do not have the front-to-rear positioning capability but rather are fixedly mounted to the floor of the vehicle. In any event, as will be well understood by those familiar with the art, there typically is a frame mounted to the floor of the vehicle and another frame mounted to the seat, and when the floor frame and seat frame are connected together in a desired manner, the seat becomes installed. The present device either incorporates the existing floor frame and seat frame, appropriately designed to accommodate the invention, or it provides additional floor and seat frame members that are attachable to the existing floor and seat frames. The third embodiment illustrates how the invention can incorporate the existing floor frame and seat frame with modifications to incorporate the invention. All embodiments could be adapted to floor and seat frames that exist in vehicles.

The first embodiment of the invention which will now be described is intended for use with a seat RS, typically a rear seat, to which the seat back RSB is not connected as is illustrated in FIG. 5. Thus, the seat back RSB is permanently attached to the vehicle frame and the seat RS can move independently of the seat back RSB.

Figure 6:
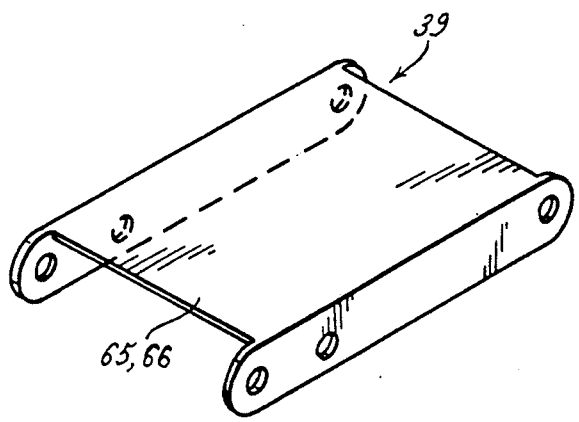
FIG. 6 is an isometric view of the front link on the device of FIG. 1.

In the first embodiment 15 of the device, the two channels 20 and 30 are connected by two links shown particularly in FIGS. 2 and 6. They consist of a rear short link 38 and a front long link 39. The rear short link is mounted upon a pivot rod 40. The pivot rod slides within generally horizontal slots 41 in upstanding flanges 44 struck upwardly from the web of the main base channel 20. Appropriate retaining devices, such as bushings, 46 hold the rod 40 in place in the respective flanges and therefore secure it firmly to the base channel 20.

The rear link 38 is shown as made up of two flanged plate-like elements 47, each having a web 48 joining two downturned flanges 50 and 51. Two of these devices are welded together as shown at 53 to form the link. The pivot rod 40 passes through the flanges 50 and 51 on the link.

The rear link 38 is also pivoted to the seat supporting channel 30 by a pivot rod 54 that passes through the flanges 50 and 51 of the two elements 47 making up the link 38 and is anchored by suitable hubs 57 to the side flanges of the seat supporting channel 30. Appropriate bushings 58 are mounted on the ends of the rod 54 and ride in sloping slots 59 that are provided in the upstanding flanges 44 of the base channel 20. As will appear, when the seat is caused to move forward as by inertia upon a collision, the initial and subsequent movement of the rod 54 will be both upward and forward because the pivot rod 40 will move forward in the slots 41 for a short distance during which the pivot rod 54 will be caused by the sloping slot 59 to rise until it escapes from that slot, and it can move further.

The forward link 39 is made similarly to the link 38 except that it is longer. Like the rear link, this front link is made up of two flanged elements 65 and 66 welded together at their adjacent downturned flanges. It can be approximately 6-¼ inches across from flange to flange. There are two upstanding flanges 67 projecting upwardly from the web of the base plate 20, having generally horizontal slots 70 to receive the ends of a pivot rod 71 which is mounted therein similarly to the mounting of the pivot rod 40. The pivot rod 71 extends through the downturned flanges of the elements 65 and 66.

A rod 72 extends through the downturned flanges of the elements 65 and 66 and rides in sloping slots 74 in the upstanding flanges 67 that are similar to but slightly steeper than the slots 59. The link 39 has a rear pivot rod 80 extending through the downturned side flanges of the members 65 and 66 and the rod 80 is anchored in the sides of the top channel 30. In the channel 30 are appropriate spacers 82 to provide for the proper positioning of the rear end of the link 39 into the top channel and, since the forward end of the link is anchored in the flanges 67 struck up from the base, the total overall arrangement is stable.

Thus as the link 39 is moved forwardly, the rod 72 will ride in the sloping slots 74 and force the link 39 to swing upwardly about the rod 71. Since the link 39 is much longer than the short link 38, its free end carrying the rod 80 will move upwardly at a greater rate than will the end of the link 38 that carries the rod 54, and the seat RS will move accordingly.

The second embodiment 16 of this device is illustrated in FIG. 7, 8 and 9, as well as FIG. 1. In the embodiment 16 of the device, some of the components can be the same as used for the device 15, and those components will not be re-described. The device 16 is particularly adapted for installation in connection with a vehicle front seat assembly that has a front seat FS and a front seat back FSB that is connected to the front seat rather than to the vehicle frame.

In FIG. 7, this connection is indicated by dotted lines suggesting side flanges A on the seat back FSB that are mounted on pivots B supported by the seat FS. Typically a latch mechanism (not shown) locks the seat back FSB against pivoting. Many other connections are used, including fixed connections of the seat back to the seat, but it has been observed that, whatever the connection, the front seat back FSB affects the forces applied to the device 16. This is because the front seat back is normally tilted rearwardly as illustrated in FIG. 7 with the result that forward inertia will produce an initial downward force at the back of the seat immediately followed by and replaced with an upward force. Because the front of the seat is forward of the seat back, the moment applied by the seat back produces a continuous downward force at the front of the seat.

In the device 16, the channel member 20 differs from that of the embodiment 15 in that the upstanding flange members 44 and 67 are free of ramps and slots like the slots 41 and 70, and the ramps 59 and 74. Instead, there is a rear link 93 that has a lower forward end pivotally mounted on a pivot rod 40 that is mounted in, but does not slide with respect to, the upstanding flanges 44. The upper rearward end of the link 93 is pivotally mounted to a pivot rod 54 that is mounted between the sides of the upper channel member 30 as described in conjunction with the device 15.

The device 16 also has a longer forward link 94, and the forward end of the link 94 is pivotally mounted on a pivot rod 71 that is supported by the upstanding flanges 67. The upper rearward end of the link 94 is pivotally mounted on a pivot rod 80 that is mounted between the sides of the upper channel member 30. In its at-rest or unactivated condition, the upper channel member 30 rests upon the lower channel member 20.

Figure 10:
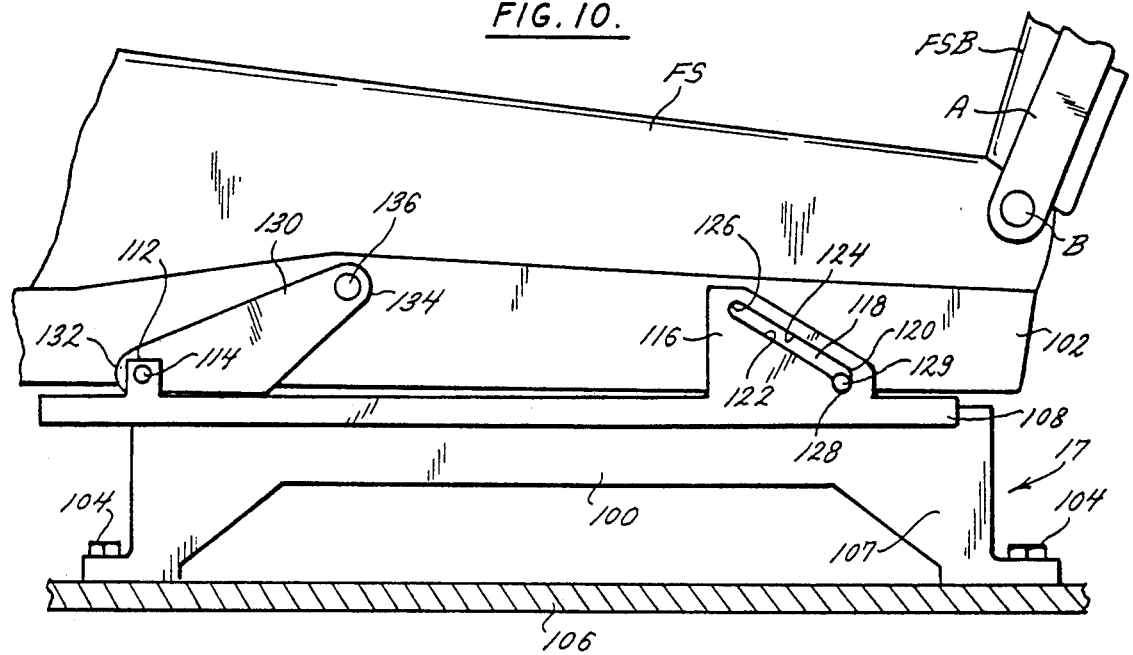
FIG. 10 is a side elevation view of a third embodiment of the invention showing the device installed on existing, but modified, vehicle floor and seat frames and showing the device in its at-rest condition.
Figure 11:
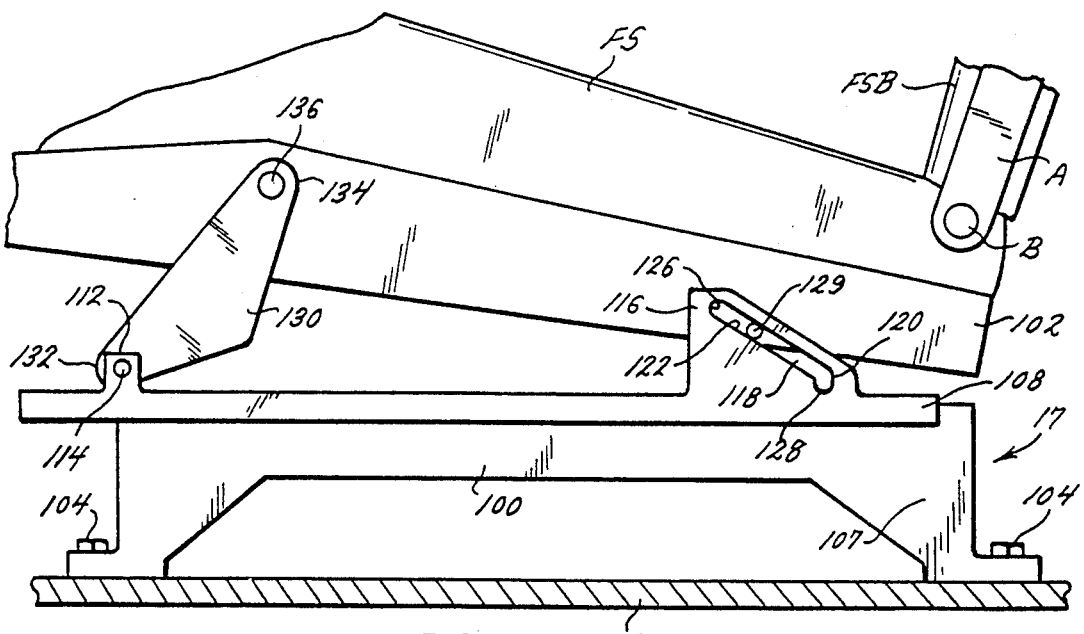
FIG. 11 is a side elevation view similar to that of FIG. 10 but showing the device in an advanced condition following impact.

In the third embodiment 17 of the invention, one side of the safety device 17 is illustrated in FIGS. 10 and 11 and it will be understood that an opposite side is a mirror image thereof. The safety device 17 is installed directly on and between a floor frame 100 and a seat frame 102 of a vehicle. The floor frame 100 is shown conventionally fastened, such as by bolts 104, to the chassis 106 of the vehicle. The seat frame 102 is attached to a vehicle seat, typically a front seat FS, to which a front seat back FSB is connected such as by a side member A and an attaching member B as is well known in the art. Typically, the seat back FSB is latched or otherwise fixed against pivoting relative to the seat FS.

The floor frame 100 includes a lower section 107 that is fixed by mounting bolts 104 to the chassis 106 and an upper section 108 that is slidable on the lower section to adjust the fore and aft position of the seat FS as is conventional. This adjustment can be either by a hand-operated lever mechanism (not shown) or by fully versatile power actuated means (not shown) and the present safety device does not interfere with the operation of any manual or power-operated seat adjustment means commercially used in vehicles.

To accommodate this invention, the slidable section 108 of the floor frame 100 is modified to provide a lug 112 in which a shaft or rod 114 can be mounted with suitable means (not shown) to prevent the shaft 114 from sliding laterally free of the lug 112. The slidable section 108 is further modified to provide a plate portion 116 appropriately shaped to accommodate a slot 118 that has a lower arcuate end 120 located adjacent the bottom of the seat frame 102 and has side edges 122 and 124 extending upwardly therefrom at an angle of approximately 30° to a horizontal plane. The slot 118 terminates at an upper arcuate end 126 that is about 2-5/16 inches from the lower rearward end 120. The slot also may have a slight depression 128 at the lower rearward end, the center of which is only about 0.020 inch or less below the center of the arcuate end 120 of the slot 118. A pin 129 is affixed to the seat frame 102 and slides in the slot 118. The pin is structured so that it cannot escape from the slot 118, and this may be done by providing a head on the pin or by any other way known in the art.

Returning to the forward end of the device 17, a link 130 has a lower forward end 132 and adjacent the end 132, the link 130 is mounted on the shaft 114. The link has an upper rearward end 134 and adjacent the end 134, the link is pivotally connected to the seat frame 102, such as by a pin 136. The pin 136 is structured so that the link 130 will not slide free of it. This can be accomplished by fixedly mounting the pin 136 to the seat frame 102 and providing a head on it with the link 130 positioned between the head and the frame 102. Such structure and various modifications of it are well within the skill of the art.

Although not to be limiting and allowing for all variations within the scope of the invention, the following dimensions are given. The link 130 is preferably about 3-¾ inches long between the rod 114 and the pin 136. Also, in the at-rest position as illustrated in FIG. 10, the pin 136 is about 3-5/16 inches to the rear of the rod 114 and it is about 1-⅛ inches above the rod 114. At the rear end, the slot 118 is about 2-5/16 inches long between the centers of its arcuate ends 120 and 126. In the at-rest position illustrated in FIG. 10, the distance between the rod 114 and the pin 129 is about 10-7/16 inches.

It should be noted that the detent 128 can be eliminated if it is found to impede in any way the initiation of movement of the device 17 upon sudden deceleration of the vehicle. The only purpose of the detent 128 is to prevent rocking of the seat in the at-rest condition. The detent is not normally incorporated but means other than the detent could be used if desired as will be apparent to those skilled in the art.

FIGS. 12–15 illustrate a fourth embodiment 18 of the invention. As with previously described embodiments, one side of the safety device 18 is illustrated and will be described and it will be understood that the opposite side would be a mirror image.

The safety device 18 comprises an upper member 142 and a lower member 144, both of which may be of any configuration. The upper member 142 may be part of a seat bottom frame and the lower member 144 may be part of a seat base that is fixed to the floor of a vehicle or to a manual or power operated seat adjustment mechanism that in turn is fixed to the floor of the vehicle. When at-rest, the upper member 142 rests upon the lower member 144.

Toward the rear of the safety device 140, the base 144 supports a plate section 146 that has a slot 148 in it. The slot 148 extends from an arcuate rear end 150 forwardly and upwardly to an arcuate forward end 152. Preferably the slot 148 is at an angle of approximately 30° to horizontal and is about 2-⅛ inches long. The slot 148 is further defined by upper and lower edges 154 and 156 and may have a slightly depressed detent 158 at its lower rear end. The upper member 142 carries a lug 160. A pin 162 is fixed to the lug 156 and projects into the slot 148.

A dual component linkage 164 operates at the front end of the safety device 140. The linkage 164 comprises a forward component 166 and a rearward component 168. The forward component 166 has a forward end 170 pivotally mounted on a shaft 172 that extends through the lower member 144. The rearward end 174 of the link component 166 is pivotally connected by a pin 176 to the forward end 178 of the rearward link component 168. The rearward end 180 of the component 168 is pivotally mounted on a shaft 182 that extends through the upper member 142.

Figure 12:
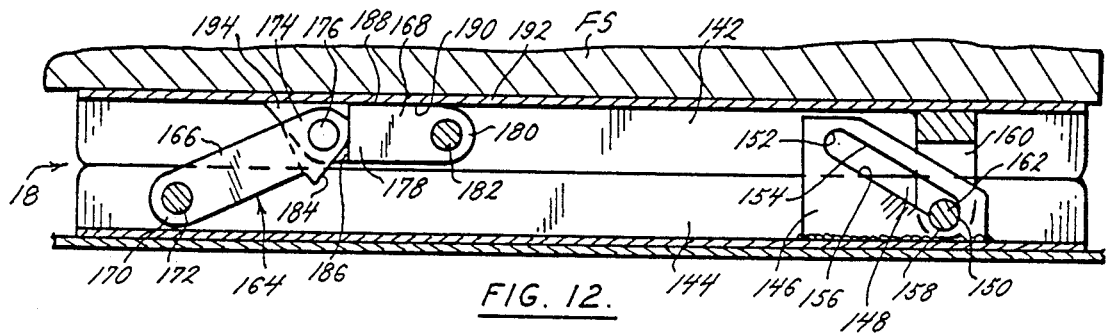
FIG. 12 is a side elevation view of a fourth embodiment of the invention shown in an unactivated condition.
Figure 13:
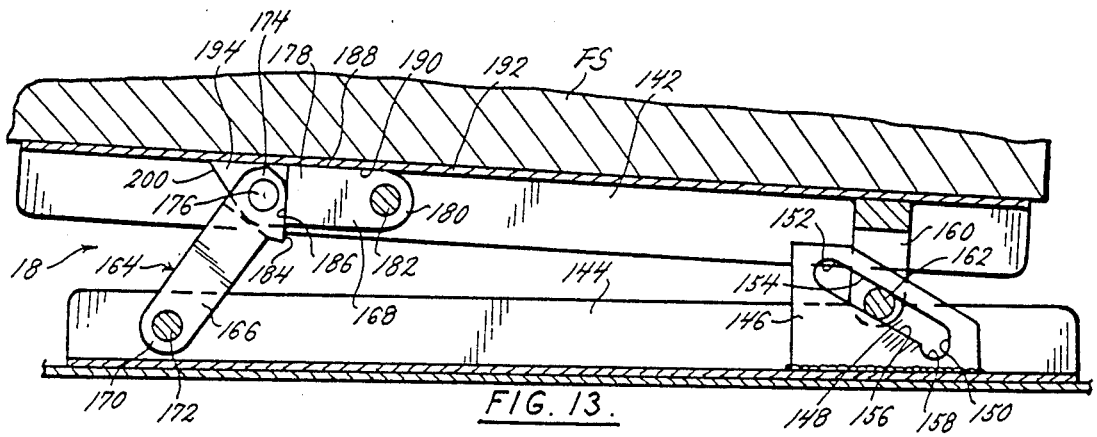
FIG. 13 is a side elevation view of the fourth embodiment of FIG. 12 but showing the device in a partially activated condition.
Figure 14:
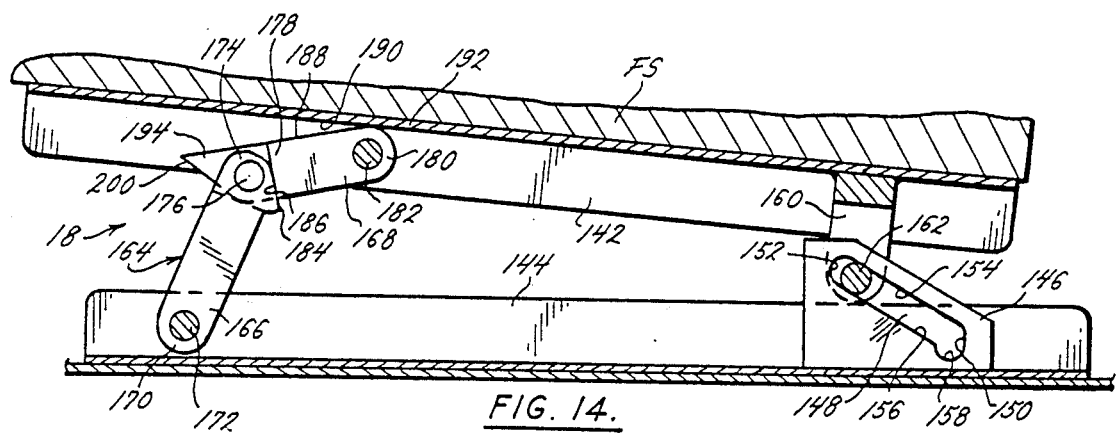
FIG. 14 is a side elevation view similar to that of FIG. 12 but showing the device in a further activated condition.

The linkage components 166 and 168 have opposed faces 184 and 186, respectively, that are spaced from one another when the safety device 140 is in the unactivated condition illustrated in FIG. 12. The faces 184 and 186 contact one another and act as stops when the linkage component 166 has pivoted relative to the component 168 through an angle of approximately 20° as is illustrated in FIG. 13. The rearward linkage component 168 has a top surface 188 that bears against a bearing face 190 of a wall 192 on the upper member 142. The surface 188 may have a section 194 that projects forward of the pivot pin 176, as illustrated.

Figure 15:
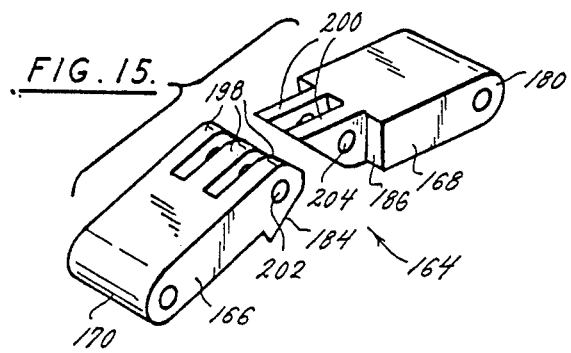
FIG. 15 is an exploded perspective view of the linkage incorporated in the device of FIGS. 12 through 14.

The linkage components 166 and 168 may be of any suitable form. As illustrated in FIG. 15, the forward component 166 has spaced ears 198 that interlock with complementary ears 200 on the rearward component 168, and the pin 176 extends through holes 202 and 204 in the ears 198 and 200 to provide a strong pivotal connection.

Preferably, the forward link component 166 is about 1-⅞ inches between its pivot centers 172 and 176 while the rearward link component 168 is about 1-⅛ inches between its pivot centers 176 and 182. In the at-rest condition of FIG. 11, the forward link component 166 is at about a 30° angle to horizontal and the rearward link component 168 is horizontal. The distance between the pivot 172 and the pin 162 is about 10-¾ inches.

The fifth embodiment 19 is similar to the fourth embodiment in the incorporation of the front linkage 164 having the two components 166 and 168. However, at the back of the seat FS, the safety device 19 incorporates an arcuate slot 210 in the plate 146. The slot extends between an arcuate rear end 212 and an arcuate forward end 214 and has upper and lower edges 216 and 218 spaced to accommodate the pin 162. The slot arc defined by the slot 210 causes the pin 162 to travel through an arc having a radius of approximately 2-⅛ inches. The straight-line distance between the centers of the ends 212 and 214 of the slot 210 is about 2-⅛ inches. The center of the arc defined by the slot preferably is directly above the center of the arcuate end 212. Therefore, the instantaneous initial movement of the pin 162 is forward only, but immediately thereafter, a constantly increasing upward component is imparted to the movement of the pin 162.

Figure 19:
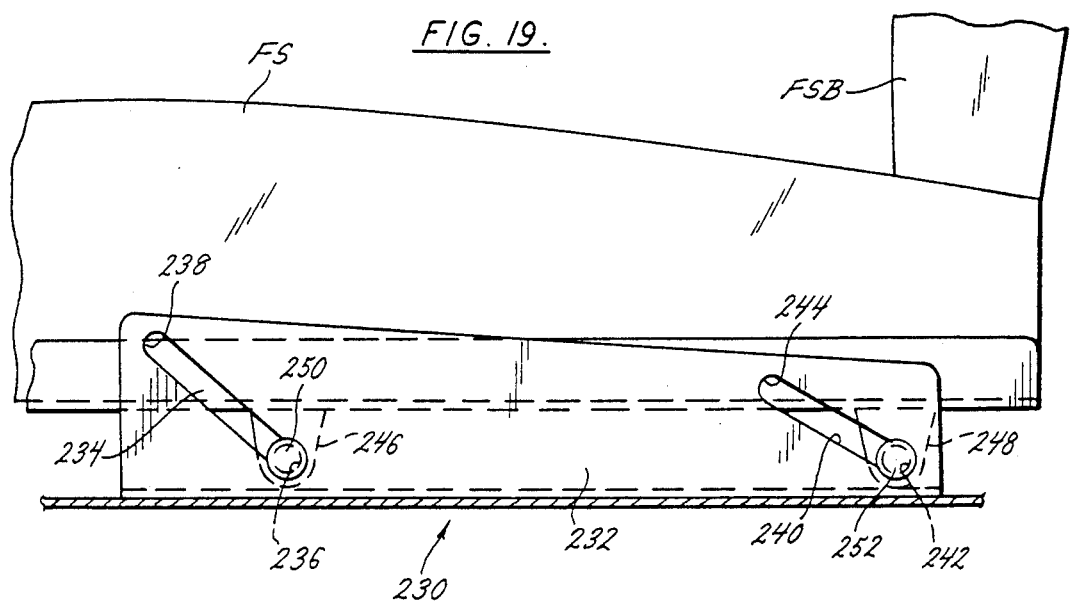
FIG. 19 a side elevation view of a sixth embodiment of the invention shown in an unactivated condition.
Figure 20:
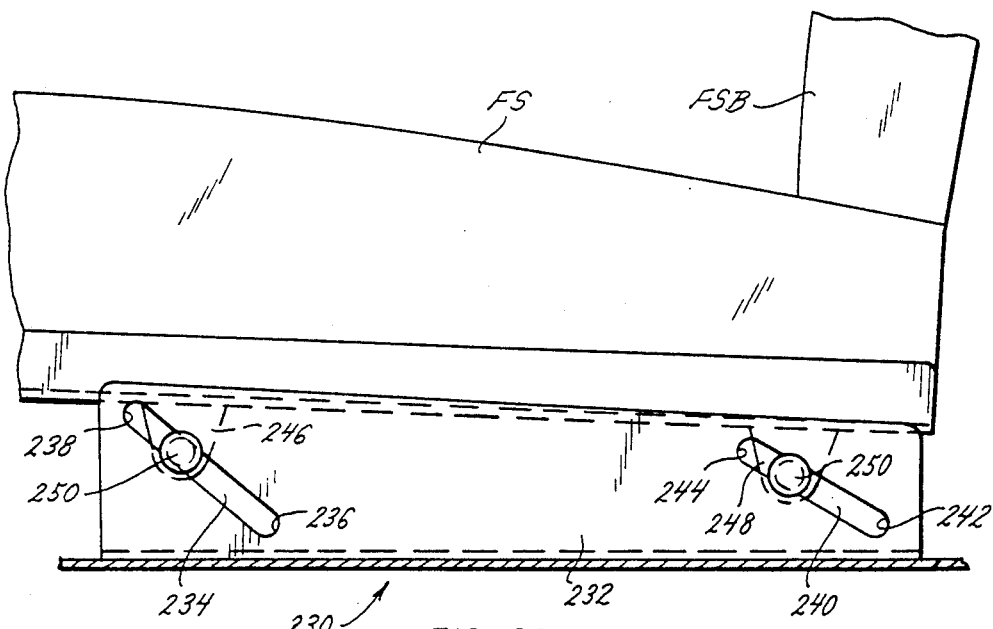
FIG. 20 is a side elevation view of the sixth embodiment showing the device in an activated condition.

A sixth embodiment 230 of this invention is illustrated in FIGS. 19 and 20. A safety device 230 is installed on each side of the seat FS or is built into the existing seat support assembly. The device 230 includes a side bracket 232 that is fixed to the seat supporting frame. The bracket 232 has a forward slot 234 that extends from a lower rearward end 236 to an upper forward end 238, preferably at an angle of about 35°–45° relative to horizontal. At the rear end of the bracket 232 generally directly below the front of the seat back FSB there is another slot 240 that extends upwardly from a lower rear end 242 to an upper forward end 244, preferably at an angle of between about 20° and 35° relative to horizontal. Whatever the angles, it is preferable that the slot 234 be at a greater angle to horizontal than is the slot 240, preferably by about 5°–25°.

Supported from the seat FS, such as from forward and rearward lugs 246 and 248 respectively, are forward and rearward pins 250 and 252. The front pin 250 projects into the slot 234 and the rear pin 252 projects in the slot 240 and the pins 250 and 252 are retained by suitable means, such as by heads on the pins, from being withdrawn from the slots.

The angle of the front slot 234 relative to horizontal preferably is always greater than is the angle of the rear slot 240. The front slot can be at an angle that varies between 35° and 50° and the rear slot can be between an angle that varies between about 20° and 35°. The length of each slot can vary and what is important is that the length be adequate to sustain the controlled movement of the seat FS through the controlled path for the duration of deceleration of the seat and the occupant. In the embodiment illustrated, the forward slot 234 is about 5 inches long and the rear slot 240 is about 4-¾ inches long. The width of the slots can be varied but a width of about ⅜ inch with corresponding diameters of the pins 250 and 252 of about ⅜ inch have been satisfactory in tests conducted of the safety device.

A seventh embodiment 260 is illustrated in FIGS. 21 and 22. The safety device 260 is similar to the safety device 230 just described except for the configuration of the front and rear slots 262 and 264 respectively. The front slot 262 has an arcuate starting section 266 that leads to a straight ramp section 268. The arcuate starting section 266 begins at a lower rearward end 270 and extends through a short arc to the down rearward end of the straight ramp section 268. The straight ramp section 268 continues to an upper forward end 272.

The end 270 is in the form of a semicircle which, as shown in FIG. 23, has a center indicated at 280. The center line of the arcuate section 266, indicated at 276, extends from the point 274 to a point 278 where the straight section 268 begins. The center 280 of the arcuate center line 276 is directly above the point 274 by a distance of about ¾ inch. Thus, the radius of the center line 276 of the arcuate section 266 is about ¾ inch. The length of the center line 276 of the arcuate section 266 will depend upon the angle of inclination of the straight ramp section 262 relative to horizontal. In the illustrated example of FIG. 23, the angle of the straight ramp section 262 is about 35° and the length of the center line 276 of the arcuate section 266 between the two points 274 and 278 is about 7/16 inch. The length of the straight ramp section 262 should be long enough to sustain the controlled movement of the seat FS during deceleration. In the illustrated example of FIG. 23, the straight ramp section 262 is about 4-⅜ inches from the point 278 to the center of the semicircular end 272. Once again, the width of the slot 268 is about ⅜ inch as is the diameter of the pin 250.

Similarly, the rearward slot 264 has an arcuate starting section 284 and a straight ramp section 286. The arcuate section 284 extends from a lower rearward end 288 to the straight ramp section 286 and the straight ramp section 286 continues to an upper forward end 290. The end 288 is semicircular, having a center point 292. The center line 294 of the arcuate section 284 has a center point 296 directly above the point 292 by a distance of about ¾ inch and the center line 294 extends to a point 298 where the straight ramp section 286 begins. Once again, the angle of the straight ramp section 286 relative to horizontal will determine the length of the arc 294. In the example of FIG. 24, the straight ramp section 286 is at an angle of about 25° to horizontal which puts the length of the center line 294 of the arc section 284 between the points 292 and 298 at about 5/16 inch. The straight ramp section 286 is about 4-⅛ inches long from the point 298 to the center of the semicircular end 290.

As with other embodiments of the invention, it is desired that the front portion of the seat FS rise at a greater rate than the rear portion so it is desired that the angle of the straight ramp section 268 relative to horizontal be greater by about 5°-25° than is the angle of the straight ramp section 286. The angle of the forward straight ramp section 268 can vary between about 25° and about 50° and the angle of the rear ramp section 286 can vary between about 15° and about 40°.

An eighth embodiment 306 is illustrated in FIGS. 25-27. The safety device 306 is primarily a modification of the safety device 230 illustrated in FIGS. 19 and 20 as indicated by the reference characters on FIGS. 25-27 that are the same as those on FIGS. 19 and 20.

In the safety device 306, there is a slot 308 that extends upwardly and rearwardly from the lower rearward end 236 of the slot 234. The slot 308 terminates at an upper rearward end 310. Rearward, there is a slot 312 that extends upwardly and rearwardly from the lower rear end 242 of the slot 240. The slot 312 terminates at an upper rearward end 314. In this illustrated embodiment 306, the slot 308 is at about the same angle and is about the same length as the slot 240 except the slot 240 extends upwardly and forwardly and the slot 308 extends upwardly and rearwardly. Likewise, the slot 312 is at about the same angle and length as the slot 234, but the slot 312 extends upwardly and rearwardly.

A ninth embodiment 320 is illustrated in FIGS. 28-30. The safety device 320 is a modification of the safety device 260 illustrated in FIGS. 21-24. The safety device 320 incorporates a slot 322 that extends upwardly and forwardly from the lower rearward end 270 of the slot 262. The slot 322 has an upper rearward end 324.

Rearward, there is a slot 326 that extends upwardly and rearwardly from the end 288 of the slot 264. The slot 326 has an upper rearward end 328. The angles and lengths of the slots 322 and 326 may vary. In the safety device 320 as illustrated, both are at angles of about 30° to horizontal.

A tenth embodiment 340 is illustrated in FIG. 31 and 32. The safety device 340 is shown incorporated into a frame that includes a seat cushion support frame 342 and a seat cushion frame 344. The seat cushion support frame 342 has a front leg 346, the lower end 348 of which is adapted to be mounted on a vehicle floor. The upper end 350 of the front leg 346 is joined to a brace 352 that extends downwardly and rearwardly to a lower end 354 adapted to be installed on the vehicle floor. The front leg 346 and its brace 352 are thus fixed in position.

A rear leg 356 has a lower end 358 mounted on an appropriate pivot pin 360 to the brace 352 adjacent the floor of the vehicle. The rear leg 356 may have an upward extension 362 that defines a side of the back of the seat.

A plate 364 is affixed to or integral with the fixed front leg 346 and its brace 352. The purpose of the plate 364 is to provide a slot 366. The slot 366 may preferably be of the configuration of the slot 262 of the embodiment 260 illustrated in FIGS. 21-24.

The seat cushion frame 344 is pivotally connected adjacent its rear end 370 to the rear leg 356 by a suitable pin 372. The cushion support frame 344 has a forward portion 374 that supports a pin 376. The pin 376 extends through the slot 366 and rides in the slot 366, held in position by suitable means such as an enlarged head.

It will of course be understood that a similar device 340 is installed on the opposite side of the seat. It will also be appreciated that a cushion (not shown) is supported by the cushion frame 344 and that appropriate skirt means, typically provided as molded plastic, would surround portions of the cushion frame 344 that are exposed, blocking the safety device 340 from view and protecting against manual contact with it.

OPERATION

In operation, if the vehicle has a collision, such as from striking another vehicle head-on or striking an immovable object, inertia will cause both the front and rear seats to move forward relative to the suddenly stopped vehicle. The rear seat back RSB, being fixed to the vehicle frame, will stop with the vehicle and will not move forward. The front seat back FSB will swing forward about its attachment B to the front seat FS.

In the operation of all of the safety devices of this invention, it is believed that the inanimate front and rear seats FS and RS and the front seat back FSB move faster than does the live passenger. Accordingly, while the seat is moving forward, there is time to move it upwardly without losing contact with the passenger. By moving the seat upwardly as it moves forwardly and thereby moving the passenger upwardly as the passenger's momentum moves him forwardly, dissipational deceleration forces are added to the already existing natural deceleration.

In addition, because the device moves the passenger upward as well as forward, time is consumed in travelling through the additional path. This adds to the time it would have taken the passenger to impact and fly through the windshield, giving added time to enable the passenger to decelerate without actually reaching the windshield or other fixed barrier within the vehicle.

Referring now to the operation of the device 15, because the entire inertial force or momentum of the rear seat RS is forward, substantially the entire inertial force of the seat RS and channel member 30 is forward. The initial movement forward takes place by having the pins 40 and 71 move forward in their respective slots 41 and 70. At the same time, there is a simultaneous raising of the two pivot rods 54 and 72 in their respective sloping slots 59 and 74. This simultaneous raising is significantly important to the present operation.

When the two rods 40 and 71 reach the ends of their slots 41 and 70, there can be no more forward movement of the seat relative to the vehicle. However, it is during this movement that the two rods 54 and 72 are caused to move up their sloping slot edges until they are free. In doing so, the two links 38 and 39 are pivoted upwardly.

The device 16 does not depend upon slots like the sloping slots 59 and 74 for its upward movement. When at rest as shown in FIG. 7, the upper channel 30 rests on the lower channel 20. Upon a collision, the inertial forces created by the seat back FSB are forward and are believed to be initially downward followed immediately by upward. The upward component of the inertial force lifts the rear end of the channel member 30 as the forward component of the force moves the channel member 30 forwardly. Because the links 93 and 94 are inclined in FIG. 7, they do not present a lock against swinging. The initial movement of the channel member 30 causes the seat FS to rise as well as move forwardly. Once again, because the forward link 94 is longer than the rearward link 93, the initial and primary rise of the front of the seat FS is greater than at the rear.

Under impacts up to substantial speeds, such as up to about 50-60 miles per hour, the rear link 93 will not reach a 90° angle relative to the horizontal bottom channel member 20 and when the momentum has been dissipated and the kinetic energy converted to static energy, the weight of the passenger will return the seat to the position shown in FIG. 7. When the impact is extremely severe, as at an extremely high speed, the rear link will swing past the 90° angle to the position shown in FIG. 9. Even in this condition, the forward link 94 is somewhat rearwardly inclined and the concentration of downward force is toward the front of the seat, so when the inertia is dissipated, the weight of the seat and of the passenger will cause the device to return to the condition shown in FIG. 7.

In the first two embodiments of the device, it has been found that in most cases the small link 38 or the link 93 usually travels to less than an upright position, at which time the seat has been lifted at both front and rear. The front is lifted further than the rear because of a difference in length of the links. When the small link approaches an upright position as in FIGS. 5 and 8 and enough time has elapsed and enough energy has been used by the lifting of both the front and the rear links with their accompanying loads, the increased contact force of the seat with the body of the person can supply enough friction to prevent his going forward any further. It also appears that when this situation has arisen, the seat tends to sink back to its original position.

If for some unexpected reason, the energy of impact were not thus dissipated, the small link could go completely over to a forward position of rest, in which event the front part of the seat would be raised to its maximum degree and the rear part of the seat would be lowered. This would further obstruct further movement of the occupant and help hold him in the seat. As a matter of experience, however, it has been found that in collisions of car-to-car up to 50-60 miles per hour, the seat does not go forward beyond an upright position of the small link 38 or the small link 93.

In operation of the embodiment 17, a sudden deceleration of the vehicle and a resulting forward momentum of the seat FS and FSB, with the seat back FSB generating an upward moment at least promptly following the moment of impact, causes the pin 129 to jump immediately upward out of the depression 128 and begin to slide within the slot 118 along a 30° path. The pin 129 carries the rear portion of the seat, controlling its direction of movement in cooperation with the direction of movement of the forward portion of the seat that is controlled as the link 130 pivots. As the ends of the link 130 pivot about the rod 114 and the pin 136, the forward portion of the seat FS is initially moved in an upward and forward direction and continues in both forward and upward components of movement through the arcuate movement of the pin 136. The average angle of this arcuate movement is approximately 45° relative to a horizontal plane through the normal paths of travel of the pin 136 under typical deceleration forces against the vehicle.

The depressed section or detent 128 is provided to releasably lock the seat FS from being inadvertently manually pushed forward. Even if the seat FS is unoccupied, this slight depression 128 will act against the pin 129 to effectively block forward rocking of the seat FS. However, the depressed section 128 may be eliminated if it inhibits forward movement of the pin 129.

The following dimensions are noted, although these are subject to variation as fully understood in the art. The entire length of the device in a forward direction can be approximately fifteen inches. The height of the flanges 44 and 67 on the two channel members can be $\frac{7}{8}$ of an inch. For the device 15, the distance between the pins 40 and 71 for the example given can be 9-5/16 inches. One of the distances between the pins 54 and 80 can be six inches.

The width of the main base channel 30 is eight inches and that of the top channel seven inches. The slope of the slot 59 can be 30° with the slot 74 at a somewhat greater angle. The length of the slots 41 and 70 can be $\frac{7}{8}$ inch. The length of the small link 38 between centers is 1-$\frac{1}{8}$ inch and the width of the links in the illustration is 6-$\frac{1}{4}$ inches, being made of two parts each 3-$\frac{1}{8}$ inches wide. The larger link 39 is of similar dimensions, save that its total length is 4-$\frac{3}{8}$ inches between outside centers, with 1-$\frac{1}{8}$ inches between centers of pins 71 and 72.

For the device 16, the rear link 93 may be about 1-$\frac{3}{8}$ inches long between pivot rods 40 and 54 and the link 94 may be about 2-$\frac{3}{4}$ inches long between the pivot rods 71 and 80. The span between the pivot rods 40 and 71 is about 7-¼ inches, and the span between the pivot rods 54 and 80 is about 8-¾ inches.

The safety device 17 of FIGS. 10 and 11 responds to deceleration forces by pivotal movement of the front link 130 as the rear pin 129 rides forwardly and upwardly in the slot 118. The angle of the slot 118 determines the angle of movement of the rear of the seat FS and preferably that angle is about 30° to horizontal. The front of the seat is moved upwardly and forwardly by the link 130 through an average angle of about 45°.

The safety device 18 has a slot 148 and pin 162 that lift the back of the seat FS as just described for the slot 118 and pin 129. The front linkage 164 operates in two stages to accommodate the downward force applied by the seat back FSB to the front of the seat FS. In the first stage, the link component 166 begins at an angle of about 30° to horizontal and swings through about a 20° angle until the stop faces 184 and 186 make contact. During this first stage, the top 188 of the link component 168 remains in contact with the bearing surface 190, preventing the link 168 from pivoting in a clockwise direction as viewed in FIGS. 12 and 13. In the second stage, because the stop faces 184 and 186 are in contact, further upward pivoting of the link component 166 swings the link component 168 with it so the two components 166 and 168 act as a single link between the pivot points 172 and 182.

The safety device 19 replaces the straight slot 148 with the arcuate slot 210. This arrangement allows the device to initiate movement with minimum opposition to an initial downward force applied by the seat back FSB to the back of the seat. The upward movement of the rear of the seat is initially minimal but is promptly and continuously increased with further forward movement.

In the operation of the safety device 230 illustrated in FIGS. 19 and 20, the at-rest or unactivated condition is shown in FIG. 19 and an activated condition is shown in FIG. 20. In the at-rest condition, the pins 250 and 252 are resting at the lower rearward ends 236 and 242 of the slots 234 and 240 respectively. Upon sudden deceleration of the forward moving vehicle (to the left as viewed in FIG. 19) the seat FS and its seat back FSB will be thrust forwardly. Because of the slots 234 and 240, the pins 250 and 252 will be caused to move through the controlled paths defined by the angles of the slots 234 and 240. As a result, the front portion of the seat FS will move upwardly as well as forwardly and also the rear portion of the seat FS will move upwardly as well as forwardly. The front portion of the seat FS will move upwardly at a greater rate than is the rear, as is clear from the actuated condition of FIG. 20.

In operation of the safety device 260 illustrated in FIGS. 21–24, the short arcuate sections 266 and 284 of the front and rear ramps 262 and 264 allow the pins 250 and 252 to begin their movement with primarily forward components of motion generally corresponding to the direction of the momentum of the seat FS and seat back FSB at the moment of impact and initiation of sudden deceleration. There is a continually increasing addition of an upward component through the arcuate sections 266 and 284 leading to the straight ramp sections 268 and 286. These short arcuate sections 266 and 284 allow the seat FS to initiate movement simultaneously with the start of sudden deceleration at the instant of a collision and make it easier for the pins 250 and 252 to start climbing the ramps defined by the straight ramp sections 268 and 286. Thereafter, almost immediately following the initiation of deceleration, the pins 250 and 252 will be guided through the paths defined by the straight ramp sections 268 and 286.

In the operation of the safety device 306 illustrated in FIGS. 25–27, the at-rest condition is illustrated in FIG. 25. An activated condition following a collision when the vehicle is moving forward (to the left in FIGS. 25–27) is illustrated in FIG. 26 and this operation is as described in conjunction with the safety device 230 of FIGS. 19 and 20. If the vehicle is hit from the rear (from the right as illustrated in FIGS. 25–27), the occupant and the seat FS have a momentum that is rearward relative to the suddenly forward moving vehicle. When this occurs, the pins 250 and 252 will be thrust from their at-rest conditions illustrated in FIGS. 25 to the actuated conditions illustrated in FIG. 27. In other words, they will climb the ramps defined by the slots 308 and 312. Since the slot 312 is inclined at a greater angle to horizontal than is the slot 308, the rear portion of the seat FS will rise at a greater rate than will the front portion.

The safety device 320 of FIGS. 28–30 operates like the safety device 260 of FIGS. 21–24 when the vehicle is suddenly stopped from moving in a forward direction as in a head-on collision. When the vehicle is hit from the rear (from the right as viewed in FIGS. 28–30) the pins 250 and 252 are guided from their at-rest condition illustrated in FIG. 28 to the actuated condition illustrated in FIG. 30. Since the slots 322 and 326 are at the same angle to horizontal, the front and rear portions of the seat will move upwardly at the same rates.

The safety device 340 is for a fixed seat such for a mass transit vehicle, as a bus, train, airplane or the like. If a vehicle is moving in a forward direction (to the left as viewed in FIGS. 31 and 32) and strikes another vehicle or fixed object, the result will be sudden deceleration of the vehicle. In the safety device 340, the forward portion 374 of the seat cushion support frame 344 will move through a path determined by the slot 366 and pin 376. This path will be similar to the path of the forward portion of the seat FS controlled by the device 260 particularly as illustrated in FIG. 23. The rear leg 356 of the cushion support frame 344 will swing about the pivot pin 360 because of the moment applied by the leg 356 and the back frame 362 together with the pulling forces applied by the cushion frame 344. The pivot pin 372 allows the leg 356 to pivot relative to the cushion frame 344 and as the leg 356 swings in a counterclockwise direction about the pivot pin 360, the pin 372 is moved forwardly and upwardly. This moves the rear portion 370 of the cushion frame 344 upwardly as well as forwardly. In this manner, the front section 374 of the seat is controlled by the slot 366 and the pin 376 and the rear section 370 of the seat is controlled by the movement of the pivot pin 372 as the rear leg 356 pivots about the pin 360. When deceleration is complete, the seat automatically returns from the actuated condition of FIG. 32 to the unactuated condition of FIG. 31 with no damage to any components.

Tests indicated herein have been run without a seat belt and with the feet out of position to resist the forward movement of the body. Seat belts, however, take effect when the present device releases the passenger. In other words, there arises a speed of impact above which this device will not retain a passenger on a seat. At that point, the seat belt can be effective to restrain the passenger from separating from the seat.

It should be noted also that this safety device can be used in conjunction with other safety equipment. For example, if an air bag or other means is used to protect against upper body injury, the safety device of this invention can be incorporated to protect the lower body, including femur and pelvic areas.

It is contemplated that the device of this invention is omni-directional. In other words, in installations other than horizontally moving vehicles, the device can function, such as when properly oriented to prevent injury from a vertical impact.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A seat tilting device comprising:
   a seat support having front and rear portions for supporting front and rear ends of a seat;
   a base for supporting the seat support, said base having means for attachment to a vehicle chassis;
   a rear link having a first end pivotally connected to the rear portion of said seat support and a second end pivotally connected to said base;
   a front link having a length longer than that of the rear link, a first end pivotally connected to the front portion of said seat support, and a second end pivotally connected to the base;
   said second ends of the links being supported in said base for limited rear to front sliding movement with respect to the base; and
   said base including means for elevating the links during such sliding movement;
   wherein the links are pivotable from a first position in which the seat support is in contact with the base to a second position in which said seat support is disposed forwardly of the first position and the front portion of the seat support is spaced from the base at a distance greater than that by which the rear portion of the seat support is spaced from the base.

2. The seat tilting device of claim 3 wherein the seat support supports a seat and the seat is part of a seat assembly that includes a seat back having a lower portion connected to the seat and an upper portion disposed rearwardly of the lower portion.

3. The device of claim 1, wherein the second ends of the links are supported for said limited rear to front sliding movement in first slots disposed in the base and said elevating means comprises second slots in the base inclined with respect to said first slots for guiding portions of said links engaged in said second slots to elevate the links during the rear-to-front sliding movement with respect to the base.

4. The device of claim 3, wherein the second slots are open at their tops to enable the links to be swung independently thereof.

5. A seat tilting device for a vehicle having a base member supported by a floor of the vehicle and a seat above the floor, said tilting device comprising:
   a forward link and a rear link, the forward link being longer than the rear link;
   means for pivotally attaching upper ends of the forward and rear links to forward and rear parts of the seat, respectively;
   means for pivotally attaching lower ends of the links to the base member including slots of limited length disposed in the base member, with the lower ends of the links being received in said slots to restrict the lower ends from vertical movement;
   means for elevating the forward link to raise the forward part of the seat and the rear link to raise the rear part of the seat when the seat moves forward relative to the base member; and
   means for supporting the seat in its inactivated position with pivots of the links to the seat being rearward of the connection of the links to the floor whereby the links swing about their pivotal connections to the floor in automatic response to the impact of a collision.

6. A seat tilting device comprising:
   a base member,
   a seat supporting member attached to a seat,
   a rear link having front and back ends pivotally connected between a rear part of the base member and a rear part of the seat supporting member,
   a forward link having front and back ends pivotally connected between a forward part of the seat supporting member and a forward part of the base member, the rear link being shorter than the forward link,
   said base member having upstanding portions adjacent the forward link and adjacent the rear link, said upstanding portions having horizontal slots, at least one of said horizontal slots being adjacent to the front end of the forward link, and at least another one of said horizontal slots being adjacent to the front end of the rear link, each link having a pin at its front end engaged in one of said horizontal slots,
   said upstanding portions also having rear sloping slots into which a portion of the respective forward and rear links can fit for moving the links upwardly substantially as soon as forward movement of the seat occurs.

7. The seat tilting device of claim 6 wherein the seat is free of an upwardly depending seat back connected to it.

8. A safety device for a vehicle seat disposed between a seat frame supporting the seat and a base member supporting the seat frame on a vehicle chassis, said safety device being responsive to forward movement of the seat to raise the seat relative to the base member, and including:
   a first slidable connection between a rear part of the seat frame and a rear part of the base member for guiding forward movement of the seat frame and raising the rear part of the seat frame relative to the base member at a first average rate of movement less than the average rate of forward movement of the seat; and
   a second slidable connection between a forward part of the seat frame and a forward part of the base member for guiding forward movement of the seat frame relative to the base member and raising the front part of the seat frame relative to base member at a second average rate of movement greater than the first average rate whereby the seat will push an occupant thereon upwardly and moves forwardly with the occupant upon abrupt slowing of the vehicle as occurs upon collision with another object that produces inertial effects upon the seat and upon the occupant.

9. The safety device of claim 8 wherein the base member comprises a seat cushion support frame and the seat frame comprises a seat cushion frame, the seat cushion support frame having a front leg and a rear leg, the rear leg being inclined upwardly and rearwardly and having a lower end, means for pivotally supporting the lower end from the seat cushion support frame, means for supporting the front leg in fixed relation to the seat cushion support frame, means for pivotally connecting a rear portion of the seat cushion frame to the rear leg at a point spaced above the lower end whereby when the rear leg pivots forwardly about said lower end, said pivot has an upward and forward path and moves the rear portion of the seat upwardly and forwardly, and means connected between a front portion of the seat cushion frame and the front leg for controlling movement of said front portion in an upward and forward path when said seat cushion frame moves forwardly.

10. The safety device of claim 9 wherein the means for controlling movement of said front portion comprises a pin and slot connection between said front portion of the seat cushion frame and the front leg.

11. The safety device of claim 10 wherein the slot has a substantially straight section and an introductory section, the substantially straight section being at an angle of inclination relative to horizontal, the introductory section being substantially more horizontal than is the straight section and having one end opening to the straight section and the other end closed, said pin normally resting against said closed end in an unactivated condition of the device.

12. The safety device of claim 11 wherein the slot is supported from the front leg and the pin is supported from the seat cushion frame.

13. The safety device of claim 11 wherein the introductory section is substantially arcuate on a radius that is at least ½ inch long with the arc beginning at about a horizontal direction and curving to align with said straight section at said one end.

14. The safety device of claim 13 wherein the angle of the substantially straight section relative to horizontal is between about 20° and about 50°.

15. The safety device of claim 14 wherein the angle of the rear leg relative to horizontal is about 70° in the unactivated condition of the device.

16. The safety device of claim 8 wherein the first average rate of movement is approximately one-half the average rate of forward movement and the second average rate of movement is approximately equal to the average rate of forward movement.

17. The safety device of claim 8 or 16 wherein said first and said second slidable connections each comprise a pin carried by one of the seat frame and base member and a slot carried by the other of the seat frame and base member, with the pin being engaged in the slot.

18. The safety device of claim 17 wherein the pins are carried by the seat frame and the slots are carried by the base member.

19. The safety device of claim 17 wherein at least one of the slots is arcuate.

20. A safety device for a vehicle seat comprising a mechanism coupled to a seat frame attached to the seat and to a base member supporting the seat on a vehicle chassis, said mechanism being responsive to forward movement of the seat to raise the seat relative to the base member and including:
a rear pin and slot connection between a rear part of the seat frame and a rear part of the base member for guiding forward movement of and raising the rear part of the seat frame relative to the rear part of the base member in response to forward movement of the seat, said rear pin and slot connection including a rear slot extending upwardly and forwardly from a lower rearward end thereof at a first angle relative to horizontal;
a front pin and slot connection between a front part of the seat frame and a front part of the base member for guiding forward movement of and raising the front part of the seat frame relative to the front part of the base member, said front pin and slot connection including a front slot extending upwardly and forwardly from a lower rearward end thereof at a second angle relative to horizontal; and wherein the first angle is less than the second angle whereby the pins of the pin and slot connections rest in the lower rearward ends of the slots in an unactivated condition of the device and in an activated condition the seat will push an occupant thereon upwardly and moves forwardly with the occupant upon abrupt slowing of the vehicle as occurs upon collision with another object that produces inertial effects upon the seat and upon the occupant.

21. The safety device of claim 20 wherein the slots are supported from the base member and the pins are supported from the seat frame.

22. The safety device of claim 21 wherein the slots are substantially straight.

23. The safety device of claim 20 wherein said first angle is between about 15° and about 40° and said second angle is between about 25° and about 50°.

24. The safety device of claim 20 wherein said rear slot further includes an additional rear slot extending upwardly and rearwardly from the lower end of said rear slot at a third angle relative to horizontal; and
said front slot further includes an additional front slot extending upwardly and rearwardly from the lower end of said front slot at a fourth angle relative to the horizontal whereby said mechanism also is responsive to rearward movement of the seat to raise the seat relative to the base member.

25. The safety device of claim 24 wherein said fourth angle is less than said third angle.

26. The safety device of claim 25 wherein said first and fourth angles are between about 15° and about 40° and said second and third angles are between about 25° and about 50°.

27. The safety device of claim 26 wherein said first and fourth angles are approximately equal and said second and third angles are approximately equal.

28. A safety device for a vehicle seat comprising a mechanism coupled to a seat frame attached to the seat and to a base member supporting the seat on a vehicle chassis, said mechanism being responsive to forward movement of the seat to raise the seat relative to the base member and including:
a rear pin and slot connection between a rear part of the seat frame and a rear part of the base member for guiding forward movement of and raising the rear part of the seat frame relative to the rear part of the base member in response to forward movement of the seat, said rear pin and slot connection including a rear slot extending upwardly and forwardly from a lower rearward end thereof;
a front pin and slot connection between a front part of the seat frame and a front part of the base member for guiding forward movement of and raising the front part of the seat frame relative to the front part of the base member, said front pin and slot connection including a front slot extending upwardly and forwardly from a lower rearward end thereof; and wherein each slot has a substantially straight section and an introductory section, the substantially straight section being at an angle of inclination relative to horizontal, the introductory section being more horizontal than is the straight section and having one end opening to the straight section and the other end closed, whereby the pins normally rest against the respective closed ends in an unactivated condition of the safety device and in an activated condition the seat will push an occupant thereon upwardly and moves forwardly with the occupant upon abrupt slowing of the vehicle as occurs upon collision with another object that produces inertial effects upon the seat and upon the occupant.

29. The safety device of claim 20 or 28 wherein said rear pin and slot connection includes two rear slots supported from opposite sides of the base member and two rear pins supported from opposite sides of the seat frame, and said front pin and slot connection includes two front slots supported from opposite sides of the base member and two front pins supported from opposite sides of the seat frame.

30. The safety device of claim 28 wherein the slots are supported from the base member and the pins are supported from the seat frame.

31. The safety device of claim 28 wherein each introductory section is substantially arcuate on a radius that is at least ½ inch long with the arc beginning at about a horizontal direction at said closed end and curving to align with said straight section at said one end.

32. The safety device of claim 28 wherein the angle of the substantially straight section of the rear slot relative to horizontal is less than the angle of the substantially straight section of the front slot.

33. The safety device of claim 32 wherein said rear slot angle is between about 15° and about 40° and said second front slot angle is between about 25° and about 50°.

34. In a vehicle for transporting an occupant, the vehicle having a seat with a sitting area on which the occupant sits, the sitting area having a front and a rear, a vehicle safety device for automatically absorbing forces resulting from collision of the vehicle that would otherwise tend to propel and injure the occupant, said safety device comprising:
a vehicle member beneath the seat to which the seat is mounted, said vehicle member being securable with the vehicle chassis such that the vehicle member stops with the chassis upon impact of the vehicle upon collision; and
means for connecting the seat to the vehicle member including means for controlling the direction of initial movement of the entire sitting area, under forces caused by sudden deceleration upon impact of the vehicle, substantially initially to lift the entire sitting area including the front and rear thereof relative to said vehicle member immediately upon impact, the direction of movement of the front and rear of the sitting area being controlled along separate paths such that the path of movement of the rear of the seat is generally along a straight path, and the path of movement of the front of the seat is generally along an arcuate path, said generally straight path being at an angle relative to horizontal of approximately between 14 and 40 degrees, and the direction of initial movement upon impact of the front of the seat is from a point on an arc whose tangent at that point is from 25 to 50 degrees.

35. The vehicle safety device of claim 34 wherein said control means permits said sitting area to maintain close contact with the occupant in response to said impact.

36. The vehicle safety device of claim 34 wherein said connecting means comprises a pin and slot connection between the vehicle member and the rear of the seat and a link including two components pivotally connected together, one component being forward of the other and being pivotally connected to the vehicle member, the other component being pivotally connected to the front of the seat wherein said pin and slot connection and said link controls the direction of initial movement of the entire sitting area, under forces caused by sudden deceleration upon impact of the vehicle, to lift the front of the sitting area upwardly further than the rear of the sitting area.

37. The vehicle safety device of claim 36 wherein the slot of the pin and slot connection is carried by one of the vehicle member and the seat and the pin of the pin and slot connection is carried by the other of the vehicle member and the seat.

38. In a vehicle for transporting an occupant, the vehicle having a seat with a sitting area on which the occupant sits, the sitting area having a front and a rear, a vehicle safety device for automatically absorbing forces resulting from collision of the vehicle that would otherwise tend to propel and injure the occupant, said safety device comprising:
a vehicle member beneath the seat to which the seat is mounted, said vehicle member being securable with a vehicle chassis such that the vehicle member stops with the chassis upon impact of the vehicle upon collision; and
means for connecting the seat to the vehicle member including means for controlling the direction of initial movement of the entire sitting area, under the forces caused by sudden deceleration upon impact of the vehicle, substantially initially to lift the entire sitting area including the front and rear thereof relative to said vehicle member immediately upon impact, the direction of movement of the front and rear of the sitting area being controlled along separate paths, the path of movement of the rear of the seat being along an arcuate path provided by a first pin on the seat extending into a first arcuate slot in the vehicle member, said slot having a center disposed above the pin.

39. The vehicle safety device of claim 38 wherein the path of movement of the front of the seat is arcuate.

40. The vehicle safety device of claim 39 wherein the arcuate path of movement of the front of the seat is provided by second pin on the seat extending into a second arcuate slot in the vehicle member.

41. The vehicle safety device of claim 39 wherein the arcuate path of movement of the front of the seat is provided by a link having one end pivotally connected to the seat and another end pivotally connected to the vehicle member.

42. The vehicle safety device of claim 38 wherein said controlling means lifts the front of the sitting area upwardly further than the rear of the sitting area along the separate paths of movement under the forces caused by sudden deceleration upon impact of the vehicle.

43. The vehicle safety device of claim 38 wherein the path of movement of the front of the sitting area is provided by a second pin on the seat extending into a second slot in the vehicle member, said second slot having a substantially straight section and an introductory section, said substantially straight section being at an angle of inclination relative to horizontal, said introductory section being more horizontal than is the straight section and having one end opening to the straight section and the other end closed.

44. A seat tilting device comprising:
- a seat support having front and rear portions for supporting front and rear ends of a seat;
- a base attached to a vehicle for supporting the seat support;
- a first link having a first end pivotally connected to the rear portion of the seat support and second end pivotally connected to the base;
- a second link having a length longer than that of the first link, said second link having a first end pivotally connected to the front portion of the seat support and a second end pivotally connected to the base;
- said links being wide enough to extend across enough of the seat to enable them to support a seat, thereby eliminating the necessity of two such devices that would require individual alignment; and
- wherein said first and second links are pivotable from a first position in which the seat support is in contact with the base to a second position in which the seat support is disposed forwardly of the first position and the front portion of the seat support is spaced from the base at a distance greater than that by which the rear portion of the seat support is spaced from the base.

45. In a vehicle safety device, a bottom plate adapted to be connected to a base of a vehicle below a seat thereof, a top plate adapted to be connected to the seat, the two plates having offsets in opposite directions to provide a recess between them, a safety seat device within the said recess, the device comprising a base member extending fore and aft of the seat and its plates and secured to the bottom plate, said base member having opposite upstanding slotted flanges at its sides, and an inverted seat supporting channel member adapted to be secured to the top plate with its flanges downturned, a rearward link and a forward link extending across the device to the areas of the flanges on the base member, a forward pin for each of the two links extending transversely of each of them, each base member flange having a horizontal slot into which one of the forward pins is mounted for horizontal movement without vertical movement, each of the links having a rear pin extending across from side to side and engaged within the downturned flanges of the seat supporting channel member for pivotal movement therein, each of the base member flanges having a sloping slot open to the top in which a portion of one of the links can be located and can slide, such sliding movement being adapted to raise the two links from their initial positions upon forward movement of the forward pins within the horizontal slots, the forward link being longer than the rearward link such that upon forward movement, the seat supporting channel member will be offset from the base member a greater degree at the front than at the rear.

46. The safety device of claim 45 wherein said portion of one of the links comprises an intermediate pin disposed between said forward and rear pins of said one link.

47. A safety device for installation between a vehicle and a vehicle seat having a first member attached to the vehicle at a location below the seat and a second member attached to the seat, said safety device comprising a front link pivotally connected between the first and second members and a rear link pivotally connected between the first and second members, for moving the second member relative to the first member in substantially direct and substantially immediate response to sudden deceleration such as results from a collision of the vehicle, said front and rear links directing the seat in both forward and upward directions relative to the frame, with both front and rear portions of the seat moving both forwardly and upwardly and the front portion of the seat moving upwardly further than the rear portion of the seat.

48. The safety device of claim 47 wherein the moving means comprises articulated connections between the first and second members.

49. The safety device of claim 47 wherein the front link is substantially longer than the rear link.

50. A safety device for installation between a vehicle and a vehicle seat having a first member attached to the vehicle at a location below the seat and a second member attached to the seat, said safety device comprising a front pin and slot connection between the first and second members and a rear pin and slot connection between the first and second members for moving the second member relative to the first member in substantially direct and substantially immediate response to sudden deceleration such as results from a collision of the vehicle, said pin and slot connections directing the seat in both forward and upward directions relative to the frame, with both front and rear portions of the seat moving both forwardly and upwardly and the front portion of the seat moving upwardly further than the rear portion of the seat.

51. The safety device of claim 47 or 50 wherein said control means directs the movement of the front portion of the seat at an angle of between about 40° and about 50° relative to horizontal and the movement of the rear portion of the seat at an angle of between about 25° and about 35° relative to horizontal.

52. The safety device of claim 50 wherein the slots of said front and rear pin and slot connections are carried by one of the first and second members and the pins of said front and rear pin and slot connections are carried by the other of the first and second members.

53. The safety device of claim 50 wherein said moving means comprises:
- two front pin and slot connections between the first and second members, with one of the front connections being adjacent one side of the seat and the other front connection being adjacent another side of the seat;
- two rear pin and slot connections between the first and second members, with one of the rear pin and slot connections being adjacent one side of the seat and the other rear connection being adjacent another side of the seat; and
- wherein the slots of the front and rear connections are carried by the first member and the pins of the front and rear connections are carried by the second member.

54. A safety device comprising a first element attached to a normally moving frame movable in a first direction, a second element attached to a component movable relative to the frame, and means, connected between the elements, for moving the second element in the first direction upon sudden deceleration of the first element and for moving a leading portion of the second element in a second direction generally normal to the first direction a first distance and a trailing portion of the second element in said second direction a second distance of substantially less magnitude than the first distance, said moving means including at least two links of different lengths supported by one of the elements through a connection permitting limited sliding movement between said one element and the links, and means for gradually decreasing the rates of lateral movement in said second direction in response to continued movement of the second element in the first direction.

55. A safety device comprising:
(a) a frame movable in a first direction,
(b) an element for attachment to a component for normally causing the component to move parallel with the frame when the frame moves in the first direction, and
(c) means, including a linkage connected between the element and the frame, for moving the element relative to the frame in the first direction upon sudden deceleration of the frame and for moving leading and trailing portions of the element in a second direction generally normal to the first direction, said linkage comprising at least two components pivotally connected together and with a first one of the components pivotally connected to the frame and a second one of the components pivotally connected to the element.

56. The safety device of claim 55 wherein a first pivot stage following initial deceleration of the frame occurs as the first component pivots through a predetermined arc relative to the frame and relative to the second component and a second pivot stage occurs thereafter as the second component is locked to pivot with the first component as the first component pivots beyond said predetermined arc.

57. The safety device of claim 55 or 56 wherein said means for moving the element moves the leading portion of the element a first distance in the second direction and moves the trailing portion of the element a second distance in the second direction less than said first distance in response to sudden deceleration of the frame.

58. A safety device for a vehicle seat comprising a mechanism coupled to a seat frame attached to the seat and to a base member supporting the seat on a vehicle chassis, said mechanism being responsive to forward movement of the seat to raise the seat relative to the base member and including:
a rear pin and slot connection between a rear part of the seat frame and a rear part of the base member for guiding forward movement of and raising the rear part of the seat frame relative to the rear part of the base member in response to forward movement of the seat;
a front pin and slot connection between a front part of the seat frame and a front part of the base member for guiding forward movement of and raising the front part of the seat frame relative to the front part of the base member;
at least one of said pin and slot connections including at least one slot arcuate about a center disposed above the slot whereby the pins of the pin and slot connections rest in the lower rearward ends of the slots in an unactivated condition of the device and in an activated condition the seat will push an occupant thereon upwardly and moves forwardly with the occupant upon abrupt slowing of the vehicle as occurs upon collision with another object that produces inertial effects upon the seat and upon the occupant.

59. The safety device of claim 58 wherein each of said pin and slot connections include a slot arcuate about a center disposed above the slot.

60. The safety device of claim 58 or 59 wherein the front pin and slot connection raises the front part of the seat frame upwardly further than the rear pin and slot connection raises the rear part of the seat frame upwardly in response to forward movement of the seat.

61. The safety device of claim 60 wherein the slots are supported from one of the base member and the seat frame and the pins are supported from the other of the base member and the seat frame.

62. In a vehicle for transporting an occupant, the vehicle having a seat with a sitting area on which the occupant sits, the sitting area having a front and a rear, a vehicle safety device for automatically absorbing forces resulting from collision of the vehicle that would otherwise tend to propel and injure the occupant, said safety device comprising:
a vehicle member beneath the seat to which the seat is mounted, said vehicle member being securable with a vehicle chassis such that the vehicle member stops with the chassis upon impact of the vehicle upon collision; and
means for connecting the seat to the vehicle member including means for controlling the direction of initial movement of the entire sitting area, under forces caused by sudden deceleration upon impact of the vehicle, substantially initially to lift the entire sitting area including the front and rear thereof relative to said vehicle member immediately upon impact, the direction of movement of the front and rear of the sitting area being controlled along separate paths such that the direction of movement of the front of the sitting area averages between about 38° and about 52° relative to horizontal along at least most of the front path and the direction of movement of the rear of the sitting area averages between about 23° and about 37° relative to horizontal along at least most of the rear path.

63. The safety device of claim 62 wherein the control means comprises:
a rear pin and slot connection between a rear part of the first member and a rear part of the second member; and
a linkage pivotally connected between a forward part of the first member and a forward part of the second member such that the pivotal connection of the link to the base member is forward and below the connection of the link to the seat frame, said linkage having an at-rest angle relative to a horizontal plane of between about 20° and about 30° and a height between its pivot connections of between about 3-½ inches and about 4 inches whereby the seat will push an occupant thereon upwardly and moves forwardly with the occupant upon abrupt slowing of the vehicle as occurs upon collision with another object that produces inertial effects upon the seat and upon the occupant.

64. The safety seat device of claim 63 wherein the slot of the rear pin and slot connection is in the first member and the pin of the rear pin and slot connection is supported by the second member, the slot being elongated at an upward and forward angle between an upper forward end and a lower rearward end, the pin normally resting in the lower rearward end and being thrust forward and upward guided by the slot upon sudden deceleration of the vehicle.

65. The safety device of claim 63 wherein the length of the slot is at least about 2 ½ inches.

66. The safety device of claim 63 wherein the slot of the rear pin and slot connection is substantially straight.

67. The safety device of claim 63 wherein the slot of the rear pin and slot connection is arcuate.

68. The vehicle safety device of claim 62 wherein at least most of the front path is defined by a substantially straight front ramp carried by said vehicle member, said front ramp being engaged by a front projection carried by the seat, and at least most of the rear path is defined by a substantially straight rear ramp carried by said vehicle member, said rear ramp being engaged by a rear projection carried by the seat.

69. The vehicle safety device of claim 62 or 68 wherein the direction of movement of the front of the sitting area averages between about 42° and 48° relative to horizontal along at least most of the front path and the direction of movement of the rear of the sitting area averages between about 27° and 33° relative to horizontal along at least most of the rear path.

70. A safety device for installation between a vehicle and a vehicle seat, said safety device having a first member attached to the vehicle at a location below the seat and a second member attached to the seat, and comprising means connected between the first member and the second member for moving the second member relative to the first member in substantially direct and substantially immediate response to sudden deceleration such as results from a collision of the vehicle, said moving means including control means for directing the seat in both forward and upward directions relative to the frame, with both front and rear portions of the seat moving both forwardly and upwardly, and means responsive to extremely high deceleration forces for thrusting the front portion of the seat upwardly and the rear portion of the seat downwardly subsequent to both portions having moved upwardly.

71. The safety device of claim 70 wherein said control means moves the front portion of the seat upwardly further than the rear portion of the seat in substantially direct and substantially immediate response to sudden deceleration.

72. A safety device for installation between a vehicle and a vehicle seat having a first member attached to the vehicle at a location below the seat and a second member attached to the seat, said safety device comprising means, connected between the first member and the second member, for moving the second member relative to the first member in substantially direct and substantially immediate response to sudden deceleration such as results from a collision of the vehicle, said moving means including control means for directing the seat in both forward and upward directions relative to the frame, with both front and rear portions of the seat moving both forwardly and upwardly and the front portion of the seat moving upwardly further than the rear portion of the seat, and means responsive to extremely high deceleration forces for thrusting the front portion of the seat upwardly and the rear portion of the seat downwardly subsequent to both portions having moved upwardly.

* * * * *